United States Patent
Lohr et al.

(10) Patent No.: US 7,869,461 B2
(45) Date of Patent: Jan. 11, 2011

(54) SCHEDULING MODE DEPENDENT DATA TRANSMISSIONS

(75) Inventors: Joachim Lohr, Darmstadt (DE); Eiko Seidel, Darmstadt (DE); Dragan Petrovic, Darmstadt (DE)

(73) Assignee: Panasonic Corporation, Osaka (JP)

( * ) Notice: Subject to any disclaimer, the term of this patent is extended or adjusted under 35 U.S.C. 154(b) by 144 days.

(21) Appl. No.: 10/583,736

(22) PCT Filed: Jun. 14, 2005

(86) PCT No.: PCT/EP2005/006361

§ 371 (c)(1),
(2), (4) Date: Nov. 14, 2006

(87) PCT Pub. No.: WO2005/125252

PCT Pub. Date: Dec. 29, 2005

(65) Prior Publication Data

US 2007/0275728 A1 Nov. 29, 2007

(30) Foreign Application Priority Data

Jun. 15, 2004 (EP) .................................. 04014004

(51) Int. Cl.
*H04J 3/22* (2006.01)
(52) U.S. Cl. .................... 370/469; 370/474; 370/395.4; 370/395.41; 370/395.42; 455/450; 455/512
(58) Field of Classification Search .................. 370/469, 370/474, 395.4, 395.41, 395.42; 455/450, 455/512
See application file for complete search history.

(56) References Cited

U.S. PATENT DOCUMENTS

| | | | |
|---|---|---|---|
| 6,463,071 B1 | 10/2002 | Araujo et al. | |
| 6,640,105 B1 | 10/2003 | Shin | |
| 6,701,151 B2 | 3/2004 | Diachina et al. | |
| 6,792,278 B1 | 9/2004 | Ahmavaara et al. | |
| 6,813,284 B2 | 11/2004 | Vayanos | |

(Continued)

FOREIGN PATENT DOCUMENTS

KR 2003-0085124 11/2003

OTHER PUBLICATIONS

Konstantinos et al., MAC Scheduling for Uplink Transmission in UMTS WCDMA, Jun. 2001, 0-7803-6728, 5 pages.*

(Continued)

*Primary Examiner*—Huy Phan
*Assistant Examiner*—Aung Win
(74) *Attorney, Agent, or Firm*—Dickinson Wright PLLC

(57) ABSTRACT

The present invention relates to a method for transmitting data from a mobile terminal to a radio access network of a mobile communication system, the mobile terminal comprising a medium access control entity and to a mobile terminal. In order to enhance data transmission dependent on the scheduling mode, the present invention provides individual priorities depending on the scheduling mode which are used by the mobile terminal to schedule the transmission data or to multiplex different transmission data of different radio bearers onto a transport channel. Further the invention relates to a method and mobile terminal allowing a scheduling mode dependent scheduling of data transmissions by foreseeing and setting a flag for each logical channel depending on the scheduling mode of the associated radio bearer.

17 Claims, 12 Drawing Sheets

U.S. PATENT DOCUMENTS

| | | | |
|---|---|---|---|
| 2002/0085531 A1 | 7/2002 | Herrmann et al. | |
| 2002/0122400 A1 | 9/2002 | Vayanos et al. | |
| 2002/0136181 A1* | 9/2002 | Belaiche et al. | 370/337 |
| 2003/0007517 A1* | 1/2003 | Beckmann et al. | 370/537 |
| 2003/0185193 A1* | 10/2003 | Choi et al. | 370/348 |
| 2004/0028078 A1* | 2/2004 | Beckmann et al. | 370/469 |
| 2004/0120411 A1* | 6/2004 | Walton et al. | 375/260 |
| 2004/0228313 A1* | 11/2004 | Cheng et al. | 370/342 |

OTHER PUBLICATIONS

PCT International Search Report.

3rd Generation Partnership Project; Technical Specification Group Radio Access Network; Radio Interface Protocol Architecture (3G TS 25.301 version 3.3.0), Dec. 1999, XP002164238.

D. Chase, "Code Combining—A Maximum-Likelihood Decoding Approach for Combining an Arbitrary Number of Noisy Packets," IEEE Transactions on Communications, vol. 33, No. 5, May 1985, pp. 385-393.

3GPP TS25.401 v6.1.0, Technical Specification, $3^{rd}$ Generation Partnership Project, Technical Specification Group Radio Access Network, UTRAN Overall Description (Release 6), www.3GPP.com, Jun. 2003, pp. 1-44.

3GPP TR25.896 v6.0.0, Technical Specification, $3^{rd}$ Generation Partnership Project, Technical Specification Group Radio Access Network, Feasibility Study for Enhanced Uplink for UTRA FDD (Release 6), www.3GPP.com, Mar. 2004, pp. 1-179.

"Scheduled and Autonomous Mode Operation for the Enhanced Uplink," 3GPP TSG RAN WG1#31, Tdoc R1-03-0284, Tokyo, Japan, Feb. 17-20, 2003, pp. 1-7.

"HARQ Structure," 3GPP TSG-RAN WG1#31, Tdoc R1-030247, Tokyo, Japan, Feb. 18-21, 2003, pp. 1-3.

3GPP TS25.322v6.0.0, Technical Specification, $3^{rd}$ Generation Partnership Project, Technical Specification Group Radio Access Network, Radio Link Control (RLC) Protocol Specification (Release 6), www.3Gpp.com, Dec. 2003, pp. 1-78.

3GPP TS 25.321 v6.1.0, Technical Specification, $3^{rd}$ Generation Partnership Project, Technical Specification Group Radio Access Network, Medium Access Control (MAC) Protocol Specification (Release 6), www.3GPP.com, Mar. 2004, pp. 1-61.

Korean Office Action dated Sep. 28, 2010 with English translation.

* cited by examiner

SCHEDULING MODE DEPENDENT DATA TRANSMISSIONS

FIELD OF THE INVENTION

The present invention relates to a method for transmitting data from a mobile terminal to a radio access network of a mobile communication system, the mobile terminal comprising a medium access control entity and to a mobile terminal using individual priorities. Further the invention relates to a method and mobile terminal allowing a scheduling mode dependent scheduling of data transmissions.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

Hybrid ARQ Schemes

The most common technique for error detection of non-real time services is based on Automatic Repeat reQuest (ARQ) schemes, which are combined with Forward Error Correction (FEC), called Hybrid ARQ. If Cyclic Redundancy Check (CRC) detects an error, the receiver requests the transmitter to send additional bits or a new data packet. From different existing schemes the stop-and-wait (SAW) and selective-repeat (SR) continuous ARQ are most often used in mobile communication.

A data unit will be encoded before transmission. Depending on the bits that are retransmitted three different types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are heavily damaged such that almost no information is reusable self decodable packets can be advantageously used.

When employing chase-combining the retransmission packets carry identical symbols. In this case the multiple received packets are combined either by a symbol-by-symbol or by a bit-by-bit basis (see D. Chase: "Code combining: A maximum-likelihood decoding approach for combining an arbitrary number of noisy packets", IEEE Transactions on Communications, Col. COM-33, pages 385 to 393, May 1985). These combined values are stored in the soft buffers of respective HARQ processes.

Packet Scheduling

Packet scheduling may be a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the interactive and background traffic classes, though it may also be used for streaming services. Traffic belonging to the interactive and background classes is treated as non real time (NRT) traffic and is controlled by the packet scheduler. The packet scheduling methodologies can be characterized by:

Scheduling period/frequency: The period over which users are scheduled ahead in time.
Serve order: The order in which users are served, e.g. random order (round robin) or according to channel quality (C/I or throughput based).
Allocation method: The criterion for allocating resources, e.g. same data amount or same power/code/time resources for all queued users per allocation interval.

The packet scheduler for uplink is distributed between Radio Network Controller (RNC) and user equipment in 3GPP UMTS R99/R4/R5. On the uplink, the air interface resource to be shared by different users is the total received power at a Node B, and consequently the task of the scheduler is to allocate the power among the user equipment(s). In current UMTS R99/R4/R5 specifications the RNC controls the maximum rate/power a user equipment is allowed to transmit during uplink transmission by allocating a set of different transport formats (modulation scheme, code rate, etc.) to each user equipment.

The establishment and reconfiguration of such a TFCS (transport format combination set) may be accomplished using Radio Resource Control (RRC) messaging between RNC and user equipment. The user equipment is allowed to autonomously choose among the allocated transport format combinations based on its own status e.g. available power and buffer status. In current UMTS R99/R4/R5 specifications there is no control on time imposed on the uplink user equipment transmissions. The scheduler may e.g. operate on transmission time interval basis.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their CRNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used.

Enhanced Uplink Dedicated Channel (E-DCH)

Uplink enhancements for Dedicated Transport Channels (DTCH) are currently studied by the 3GPP Technical Specification Group RAN (see 3GPP TR 25.896: "Feasibility Study for Enhanced Uplink for UTRA FDD (Release 6)", available at http://www.3gpp.org). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus an enhancement of the Uu interface. In the existing R99/R4/R5 system the uplink maximum data rate control resides in the RNC. By relocating the scheduler in the Node B the latency introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control) retransmissions and the associated delays. This may improve the quality of service experienced by the end user.

To support enhancements described above, a new MAC sub-layer is introduced which will be called MAC-eu in the following (see 3GPP TSG RAN WG1, meeting #31, Tdoc R01-030284, "Scheduled and Autonomous Mode Operation for the Enhanced Uplink"). The entities of this new sub-layer, which will be described in more detail in the following sections, may be located in user equipment and Node B. On user equipment side, the MAC-eu performs the new task of multiplexing upper layer data (e.g. MAC-d) data into the new enhanced transport channels and operating HARQ protocol transmitting entitles.

Further, the MAC-eu sub-layer may be terminated in the S-RNC during handover at the UTRAN side. Thus, the reordering buffer for the reordering functionality provided may also reside in the S-RNC.

E-DCH MAC Architecture at the User Equipment

FIG. 4 shows the exemplary overall E-DCH MAC architecture on user equipment side. A new MAC functional entity, the MAC-eu 403, is added to the MAC architecture of Rel/99/4/5. The MAC-eu 405 entity is depicted in more detail in FIG. 5.

There are M different data flows (MAC-d) carrying data packets to be transmitted from user equipment to Node B. These data flows can have different QoS (Quality of Service), e.g. delay and error requirements, and may require different configurations of HARQ instances. Therefore the data packets can be stored in different Priority Queues. The set of HARQ transmitting and receiving entities, located in user equipment and Node B respectively will be referred to as HARQ process. The scheduler will consider QoS parameters in allocating HARQ processes to different priority queues. MAC-eu entity receives scheduling information from Node B (network side) via Layer 1 signaling.

E-DCH MAC Architecture at the UTRAN

In soft handover operation the MAC-eu entities in the E-DCH MAC Architecture at the UTRAN side may be distributed across Node B (MAC-eub) and S-RNC (MAC-eur). The scheduler in Node B chooses the active users and performs rate control by determining and signaling a commanded rate, suggested rate or TFC (Transport Format Combination) threshold that limits the active user (UE) to a subset of the TCFS (Transport Format Combination Set) allowed for transmission.

Every MAC-eu entity corresponds to a user (UE). In FIG. 6 the Node B MAC-eu architecture is depicted in more detail. It can be noted that each HARQ Receiver entity is assigned certain amount or area of the soft buffer memory for combining the bits of the packets from outstanding retransmissions. Once a packet is received successfully, it is forwarded to the reordering buffer providing the in-sequence delivery to upper layer. According to the depicted implementation, the reordering buffer resides in S-RNC during soft handover (see 3GPP TSG RAN WG 1, meeting #31: "HARQ Structure", Tdoc R1-030247, available of http://www.3gpp.org). In FIG. 7 the S-RNC MAC-eu architecture which comprises the reordering buffer of the corresponding user (UE) is shown. The number of reordering buffers is equal to the number of data flows in the corresponding MAC-eu entity on user equipment side. Data and control information is sent from all Node Bs within Active Set to S-RNC during soft handover.

It should be noted that the required soft buffer size depends on the used HARQ scheme, e.g. an HARQ scheme using incremental redundancy (IR) requires more soft buffer than one with chase combining (CC).

E-DCH Signaling

E-DCH associated control signaling required for the operation of a particular scheme consists of uplink and downlink signaling. The signaling depends on uplink enhancements being considered.

In order to enable Node B controlled scheduling (e.g. Node B controlled time and rate scheduling), user equipment has to send some request message on the uplink for transmitting data to the Node B. The request message may contain status information of a user equipment e.g. buffer status, power status, channel quality estimate. The request message is in the following referred to as Scheduling Information (SI). Based on this information a Node B can estimate the noise rise and schedule the UE. With a grant message sent in the downlink from the Node B to the UE, the Node B assigns the UE the TFCS with maximum data rate and the time interval, the UE is allowed to send. The grant message is in the following referred to as Scheduling Assignment (SA).

In the uplink user equipment has to signal Node B with a rate indicator message information that is necessary to decode the transmitted packets correctly, e.g. transport block size (TBS), modulation and coding scheme (MCS) level, etc. Furthermore, in case HARQ is used, the user equipment has to signal HARQ related control information (e.g. Hybrid ARQ process number, HARQ sequence number referred to as New Data Indicator (NDI) for UMTS Rel. 5, Redundancy version (RV), Rate matching parameters etc.)

After reception and decoding of transmitted packets on enhanced uplink dedicated channel (E-DCH) the Node B has to inform the user equipment if transmission was successful by respectively sending ACK/NAK in the downlink.

Mobility Management within Rel99/4/5 UTRAN

Before explaining some procedures connected to mobility management, some terms frequently used in the following are defined first.

A radio link may be defined as a logical association between single UE and a single UTRAN access point. Its physical realization comprises radio bearer transmissions.

A handover may be understood as a transfer of a UE connection from one radio bearer to another (hard handover) with a temporary break in connection or inclusion/exclusion of a radio bearer to/from UE connection so that UE is constantly connected UTRAN (soft handover). Soft handover is specific for networks employing Code Division Multiple Access (CDMA) technology. Handover execution may controlled by S-RNC in the mobile radio network when taking the present UTRAN architecture as an example.

The active set associated to a UE comprises a set of radio links simultaneously involved in a specific communication service between UE and radio network. An active set update procedure may be employed to modify the active set of the communication between UE and UTRAN. The procedure may comprise three functions: radio link addition, radio link removal and combined radio link addition and removal. The maximum number of simultaneous radio links is set to eight. New radio links are added to the active set once the pilot signal strengths of respective base stations exceed certain threshold relative to the pilot signal of the strongest member within active set.

A radio link is removed from the active set once the pilot signal strength of the respective base station exceeds certain threshold relative to the strongest member of the active set. Threshold for radio link addition is typically chosen to be higher than that for the radio link deletion. Hence, addition and removal events form a hysteresis with respect to pilot signal strengths.

Pilot signal measurements may be reported to the network (e.g to S-RNC) from UE by means of RRC signaling. Before sending measurement results, some filtering is usually performed to average out the fast fading. Typical filtering duration may be about 200 ms contributing to handover delay. Based on measurement results, the network (e.g. S-RNC) may decide to trigger the execution of one of the functions of active set update procedure (addition/removal of a Node B to/from current Active Set).

E-DCH—Node B Controlled Scheduling

Node B controlled scheduling is one of the technical features for E-DCH which is foreseen to enable more efficient use of the uplink power resource in order to provide a higher cell throughput in the uplink and to increase the coverage. The term "Node B controlled scheduling" denotes the possibility for the Node B to control, within the limits set by the RNC, the set of TFCs from which the UE may choose a suitable TFC. The set of TFCs from which the UE may choose autonomously a TFC is in the following referred to as "Node B controlled TFC subset".

The "Node B controlled TFC subset" is a subset of the TFCS configured by RNC as seen in FIG. 8. The UE selects a suitable TFC from the "Node B controlled TFC subset" employing the Rel5 TFC selection algorithm. Any TFC in the "Node B controlled TFC subset" might be selected by the UE, provided there is sufficient power margin, sufficient data available and TFC is not in the blocked state. Two fundamental approaches to scheduling UE transmission for the E-DCH exist. The scheduling schemes can all be viewed as management of the TFC selection in the UE and mainly differs in how the Node B can influence this process and the associated signaling requirements.

Node B Controlled Rate Scheduling

The principle of this scheduling approach is to allow Node B to control and restrict the transport format combination selection of the user equipment by fast TFCS restriction control. A Node B may expand/reduce the "Node B controlled subset", which user equipment can choose autonomously on suitable transport format combination from, by Layer-1 signaling. In Node B controlled rate scheduling all uplink transmissions may occur in parallel but at a rate low enough such that the noise rise threshold at the Node B is not exceeded. Hence, transmissions from different user equipments may overlap in time. With Rate scheduling a Node B can only restrict the uplink TFCS but does not have any control of the time when UEs are transmitting data on the E-DCH. Due to Node B being unaware of the number of UEs transmitting at the same time no precise control of the uplink noise rise in the cell may be possible (see 3GPP TR 25.896: "Feasibility study for Enhanced Uplink for UTRA FDD (Release 6)", version 1.0.0, available at http://www.3gpp.org).

Two new Layer-1 messages are introduced in order to enable the transport format combination control by Layer-1 signaling between the Node B and the user equipment. A Rate Request (RR) may be sent in the uplink by the user equipment to the Node B. With the RR the user equipment can request the Node B to expand/reduce the "Node controlled TFC Subset" by one step. Further, a Rate Grant (RG) may be sent in the downlink by the Node B to the user equipment. Using the RG, the Node B may change the "Node B controlled TFC Subset", e.g. by sending up/down commands. The new "Node B controlled TFC Subset" is valid until the next time it is updated.

Node B Controlled Rate and Time Scheduling

The basic principle of Node B controlled time and rate scheduling is to allow (theoretically only) a subset of the user equipments to transmit at a given time, such that the desired total noise rise at the Node B is not exceeded. Instead of sending up/down commands to expand/reduce the "Node B controlled TFC Subset" by one step, a Node B may update the transport format combination subset to any allowed value through explicit signaling, e.g. by sending a TFCS indicator (which could be a pointer).

Furthermore, a Node B may set the start time and the validity period a user equipment is allowed to transmit. Updates of the "Node B controlled TFC Subsets" for different user equipments may be coordinated by the scheduler in order to avoid transmissions from multiple user equipments overlapping in time to the extent possible. In the uplink of CDMA systems, simultaneous transmissions always interfere with each other. Therefore by controlling the number of user equipments, transmitting simultaneously data on the E-DCH, Node B may have more precise control of the uplink interference level in the cell. The Node B scheduler may decide which user equipments are allowed to transmit and the corresponding TFCS indicator on a per transmission time interval (TTI) basis based on, for example, buffer status of the user equipment, power status of the user equipment and available interference Rise over Thermal (RoT) margin at the Node B.

Two new Layer-1 messages are introduced in order to support Node B controlled time and rate scheduling. A Scheduling Information Update (SI) may be sent in the uplink by the user equipment to the Node B. If user equipment finds a need for sending scheduling request to Node B (for example new data occurs in user equipment buffer), a user equipment may transmit required scheduling information. With this scheduling information the user equipment provides Node B information on its status, for example its buffer occupancy and available transmit power.

A Scheduling assignment (SA) may be transmitted in the downlink from a Node B to a user equipment. Upon receiving the scheduling request the Node B may schedule a user equipment based on the scheduling information (SI) and parameters like available RoT margin at the Node B. In the Scheduling Assignment (SA) the Node B may signal the TFCS indicator and subsequent transmission start time and validity period to be used by the user equipment.

Node B controlled time and rate scheduling provides a more precise RoT control compared to the rate-only controlled scheduling as already mentioned before. However this more precise control of the Interference at this Node B is obtained at the cost of more signaling overhead and scheduling delay (scheduling request and scheduling assignment messages) compared to rate control scheduling.

In FIG. 9 a general scheduling procedure with Node B controlled time and rate scheduling is shown. When a user equipment wants to be scheduled for transmission of data on E-DCH it first sends a scheduling request to Node B. $T_{prop}$ denotes here the propagation time on the air interface. The contents of this scheduling request are information (scheduling information) for example buffer status and power status of the user equipment. Upon receiving that scheduling request, the Node B may process the obtained information and determine the scheduling assignment. The scheduling will require the processing time $T_{schedule}$.

The scheduling assignment, which comprises the TFCS indicator and the corresponding transmission start time and validity period, may be then transmitted in the downlink to the user equipment. After receiving the scheduling assignment the user equipment will start transmission on E-DCH in the assigned transmission time interval.

The use of either rate scheduling or time and rate scheduling may be restricted by the available power as the E-DCH will have to co-exist with a mix of other transmissions by the user equipments in the uplink. The co-existence of the different scheduling modes may provide flexibility in serving different traffic types. For example, traffic with small amount of data and/or higher priority such as TCP ACK/NACK may be sent using only a rate control mode with autonomous transmissions compared to using time and rate-control scheduling. The former would involve lower latency and lower signaling overhead.

Radio Link Control Protocol (RLC)

In the following the operation of the RLC protocol layer will be briefly summarized. It should be noted that the level of details in this and all paragraphs referring to RLC protocol is kept only to an extent sufficient to provide an understanding of the description of the present invention.

The radio link control protocol is the layer two protocol used in 3G UMTS cellular systems for flow control and error recovery for both user and control data. There are three operational modes for RLC in UMTS: transparent mode (TM), unacknowledged mode (UM) and acknowledged mode (AM). Each RLC entity is configured by RRC to operate in one of these modes (see 3GPP TS 25.322, "Radio Access Network; Radio Link Control (RLC) protocol specification; (Release 6)", version 6.0.0, available at http://www.3gpp.org).

The service the RLC layer provides in the control plane is called Signaling Radio Bearer (SRB). In the user plane, the service provided by RLC layer is called a Radio Bearer (RB) only if the PDCP (Packet Data Convergence Protocol) and BMC (Broadcast Multicast Control) protocols are not used by that service. Otherwise the RB service is provided by PDCP or BMC.

In transparent mode no protocol overhead is added to RLC SDUs (Service Data Units) received from higher layer through TM-SAP (Transparent Mode-Service Access Point). In special cases transmission with limited segmentation/reassembly capability may be accomplished. It may be negotiated in the radio bearer setup procedure, whether segmentation/reassembly is used. The transparent mode is mainly used for very delay-sensitive services like speech.

In unacknowledged mode data delivery may not be guaranteed since no retransmission protocol is used. Hence received erroneous PDUs (Packet Data Units) are discarded or marked depending on the configuration. The RLC SDUs, received from higher layer, are segmented/concatenated into RLC PDUs on sender side. On receiver side reassembly is performed correspondingly.

Furthermore ciphering may be performed in the RLC layer. The unacknowledged mode is used, e.g. for certain RRC signaling procedures. Examples of user services are the multimedia broadcast/multicast service (MBMS) and voice over IP (VoIP).

The acknowledged mode is designed for a reliable transport of packet data. Multiple-Repeat ARQ is used for retransmission of erroneous or missed PDUs. Retransmission of erroneous or lost PDUs is conducted by the sending side upon receiving a status report from the receiver.

The status report can be polled by the sender or self-triggered. The receiver sends a bitmap status report to the sender when it is polled. The report indicates the reception status (either ACKs or NACKs) within the receiving window and up to the last received PDU. An acknowledged mode RLC can be configured to provide both in-sequence and out-of sequence delivery to higher layers.

As already mentioned before, in addition to data PDU delivery, status and reset control PDUs can be signaled between the peer entitles. The control PDUs can be even transmitted on a separate logical channel, thus an AM RLC entity can be configured to utilize two logical channels—one channel for transmitting payload data one channel for control data. The acknowledged mode is the default mode for packet-type services, such as interactive and background services.

According to the UMTS specifications, the functions of the RLC layer are:

Segmentation and reassembly
Concatenation
Padding
Error correction
In-sequence delivery to higher layer
Duplicate detection
Flow control
Sequence number check
Protocol error detection and recovery
Ciphering
Suspend/resume function for data transfer Radio Bearer Configuration Radio Bearer Establishment Before starting of any transmission the radio bearer (RB) is established and all layers must are configured accordingly. The procedures for establishing radio bearers may vary according to the relation between the radio bearer and a dedicated transport channel. Depending on the QoS parameters, there may or may not be a permanently allocated dedicated channel associated with the RB.

Radio Bearer Establishment with Dedicated Physical Channel Activation

In UMTS the procedure in FIG. 11 is applied when a new physical channel needs to be created for the radio bearer. A Radio Bearer Establishment is initiated when an RB Establish Request primitive is received from the higher layer Service Access Point on the network side of the RRC layer. This primitive contains a bearer reference and QoS parameters. Based on these QoS parameters, Layer 1 and Layer 2 parameters are chosen by the RRC entity on the network side.

The physical layer processing on the network side is started with the CPHY-RL-Setup request primitive issued to all applicable Node Bs. If any of the intended recipients is/are unable to provide the service, it will be indicated in the confirmation primitive(s). After setting up Layer 1 including the start of transmission/reception in Node B, the NW-RRC sends a RADIO BEARER SETUP message to its peer entity (acknowledged or unacknowledged transmission optional for the NW). This message contains Layer 1, MAC and RLC parameters. After receiving the message, the UE-RRC configures Layer 1 and MAC.

When Layer 1 synchronization is indicated, the UE sends a RADIO BEARER SETUP COMPLETE message in acknowledged-mode back to the network. The NW-RRC configures MAC and RLC on the network side.

After receiving the confirmation for the RADIO BEARER SETUP COMPLETE, the UE-RRC creates a new RLC entity associated with the new radio bearer. The applicable method of RLC establishment may depend on RLC transfer mode. The RLC connection can be either implicitly established, or explicit signaling may be applied. Finally, an RB Establish Indication primitive is sent by UE-RRC and an RB Establish Confirmation Logical Channel Parameters At radio bearer setup/reconfiguration each involved logical channel is assigned a MAC Logical channel Priority (MLP) in the range of 1 to 8. An MLP of 1 denotes the highest degree of priority. The MAC logical channel Priority is contained in the information element (IE) "RB mapping info". Furthermore the IE "RB mapping info" contains the flag "RLC logical channel mapping indicator". This parameter is only mandatory, if "Number of uplink RLC logical channels" in IE "RB mapping info" is 2, otherwise this parameter is not needed.

As already mentioned before the AM RLC entity can be configured to utilize one or two logical channels. In case two logical channels are configured in the uplink, AM data PDUs are transmitted on the first logical channel, and control PDUs are transmitted on the second logical channel. If the flag "RLC logical channel mapping indicator" is set to TRUE, it indicates that the first logical channel shall be used for data PDUs and the second logical channel shall be used for control PDUs. FALSE indicates that control and data PDUs can be sent on either of the two logical channels. This parameter is not used in the current release and "RLC logical channel mapping indicator" shall be set to TRUE.

Transport Channels and TFC Selection

In third generation mobile communication systems data generated at higher layers is carried over the air with transport channels, which are mapped to different physical channels in the physical layer. Transport channels are the services, which are offered by the physical layer to Medium Access Control (MAC) layer for information transfer. The transport channels are primarily divided into two types:

Common transport channels, where there is a need for explicit identification of the receiving UE, if the data on the transport channel is intended for a specific UE or a sub-set of all UEs (no UE identification is needed for broadcast transport channels)

Dedicated transport channels, where the receiving UE is implicitly given by the physical channel, that carries the transport channel One example for an dedicated transport channel is the E-DCH. The data is transmitted within the transport channels during periodic intervals, commonly referred to as transmission time interval (TTI). A transport Block is the basic data unit exchanged over transport channels, i.e. between the physical layer and MAC layer. Transport blocks arrive to or are delivered by the physical layer once every TTI. The transport format (TF) describes how data is transmitted during a TTI on a transport channel.

The transport format consists of two parts. The semi-static part indicating the Transmission Time Interval (TTI) (e.g. 10 ms, 20 ms, 40 ms, 80 ms), the Type of FEC (Forward Error Correction) coding (e.g. convolutional, turbo, none), the Channel Coding-rate (e.g. ½, ⅓) and the CRC size. The second part, the dynamic part indicates the Number of transport blocks per TTI, and Number of bits per transport blocks.

The attributes of the dynamic part may vary for every TTI, whereas the attributes of the semi-static part are changed by RRC transport channel reconfiguration procedure. For each transport channel a set of transport formats are defined, the so-called Transport Format Set (TFS). The TFS is assigned to MAC layer from RRC at transport channel set up. An uplink or downlink connection typically consists of more than one transport channel. The combination of transport formats of all transport channels is known as the Transport Format Combination (TFC). At the start of each TTI, an appropriate TFC for all the transport channels is selected. Dependent on the number of transport channels, the TFC comprises a number of TFs, which define the transport format to be used for transmitting data of the respective transport channel within a TTI.

The MAC layer selects the transport format for each transport channel on the basis of a set of transport format combinations (or TFCS for transport format combination set) assigned by RRC radio resource control unit and also selects the quantity of data of each logical channel to be transmitted on the associated transport channel during the corresponding TTI. This procedure is referred to as "TFC (Transport Format Combination) selection". For details on the UMTS TFC selection procedure see 3GPP TS 25.321, "Medium Access Control (MAC) protocol specification; (Release 6)", version 6.1.0, available at http://www.3gpp.org.

For the selection of a transport format combination, the MAC layer is provided the following information:

Information on the transport channels
 Number of transport channels
 Duration and position of the TTI intervals of each transport channel
 For each transport channel a TFS (transport format set) containing possible transport formats. A transport format indicator (TFI) is assigned to each transport format. Each transport format in the TFS is represented by a pair of parameters, number of transport blocks and size of the transport blocks. The size of the transport blocks is given in terms of bits. The product of the 2 parameters represents the instantaneous bit rate of the transport channel in a TTI.
 For each transport channel, the list of associated logical channels.

Information on the logical channels
 Number of logical channels
 The associated transport channel for each logical channel
 A priority value MLP (MAC logical channel Priority) for each logical channel. The MLP contains values between 1 and 8, where 1 denotes the highest degree of logical channel priorities.
 A parameter Mode for each logical channel, which defines the operation mode of the RLC entity of the concerned logical channel. This parameter can take one of the 3 following values: AM (Acknowledged Mode), UM (Unacknowledged Mode) or TM (Transparent Mode). Regarding TFC Selection, the handling of logical channels operating in AM or UM is the same. In this invention we only consider logical channels, which are tight to a RLC entity operating in either AM or UM. For a logical channel in AM or UM mode, NbBits denotes the bits available in the associated RLC entity.

Among all these parameters, the MLP and Mode parameters are semi-static and can be modified by radio bearer reconfiguration procedure. NbBits (number of bits in the associated RLC entity) is dynamic and can vary with each TTI of the transport channel associated with the logical channel concerned.

TFC selection is carried out at the start of each reference TTI, which denotes the smallest TTI of the involved transport channels. If for example TFC selection is performed among three transport channels with a TTI length of transport channel #1 equals 10 ms and a TTI length of equal to 40 ms for transport channels #2 an #3, TFC selection is performed every 10 ms.

TFC selection in the UE is performed in accordance with the priorities indicated by RRC (MLPs). Logical channels have absolutely priority; therefore MAC may select a TFC from the TFCS, which maximizes the transmission of higher priority data.

As already mentioned before, RRC assigns UE a set of transport format combinations (TFCS). UE estimates for each TFC in the TFCS the transmission power. In order to guarantee, that the required transmission power for a TFC does not exceed the maximum allowed UE transmit power, the UE limits the usage of transport format combinations in the assigned TFCS. All TFCs, which require more than the maximum allowed UE transmitter power shall be set to the so called "excess power state". All the other TFCs are set to "supported state". MAC selects a TFC from the set of supported TFCs.

During selection, the logical channels may be processed in ascending order of their priority values (MLP), in descending order of their degree of priority. An exemplary TFC selection process is described with reference to FIG. 10.

A variable, called MLP_var, is initialized to 1. It is checked, whether at least one of the logical channels, involved in TFC selection, has a MLP equal to MLP_var. If there is none, parameter MLP_var is incremented by one, the degree of priority is decreased. In case one logical channel has a priority degree of MLP_var, it is checked whether the number of valid TFCs is equal to 1.

If there is just one TFC in the TFCS, this TFC is selected and TFC selection is terminated. Otherwise if the subset of valid TFCs, which is referred to as TFCS_valid in the figure, comprises several combinations of transport formats, the TFC, which enables the UE to transmit the largest possible amount of data for the logical channel of priority equal to MLP_val is selected.

The subset of TFCS is then reduced to the combination of transport formats allowing to transmit an amount of data, which is at least equivalent to that of the previously selected TFC. It is then checked whether MLP_var is equal to 8. In case it is equal to 8, the transport format combination, selected in the previous step, is chosen and TFC selection is terminated. Otherwise MLP_var is incremented by 1 and previous steps are repeated as shown in the figure. The finally selected TFC shall maximize the amount of data, transmitted in the transport channels, according to the priorities of the associated logical channels.

As already mentioned above, two scheduling modes considered to be used for E-DCH: rate controlled and time and rate controlled scheduling mode. In the rate controlled mode UEs are allowed to transmit autonomously up to a maximum data rate, signaled by Node B. This maximum data rate is valid until the next TFCS restriction message (rate grant) is sent by Node B scheduler. Since Node B scheduler has no control on the transmission timing of UEs in the rate controlled mode, uplink resources are not explicitly reserved for a UE.

In the time and rate controlled scheduling mode, Node B additionally controls the time when UEs are allowed to transmit. The scheduling assignment includes a TFCS indicator, which specifies the maximum allowed data rate/power level and also indicates the time interval, the UE is allowed to transmit with the indicated maximum data rate. Node B scheduler reserves uplink resources (capacity) for the scheduled UEs in the signaled time interval.

Furthermore in case E-DCH transmission is performed in time and rate controlled mode, this transmission is taken into account for the scheduling of other UEs in the cell. Therefore it should be ensured, that UEs, which are scheduled for a specific time interval (time and rate controlled scheduling mode) utilize the reserved resources for data transmission on E-DCH. In case UE cannot transmit data on E-DCH at requested data rate in assigned time interval due to other simultaneous uplink traffic, UE have to send another scheduling request to Node B.

Therefore the service transmitted on E-DCH would experience a longer delay. For transmissions in rate controlled mode this problem is not that critical, since Node B scheduler does not explicitly reserve uplink resources for a specific time interval. UEs are allowed to transmit at any time.

SUMMARY OF THE INVENTION

One of the various objects of the present invention is to enhance data transmission depending on the scheduling mode.

The object is solved by the subject matters of the independent claims. Preferred embodiments of the present invention are subject matters to the dependent claims.

According to an embodiment of the present invention a method for transmitting data from a mobile terminal to a radio access network of a mobile communication system is provided. In this embodiment, the mobile terminal comprises a medium access control entity.

In order to transmit data, a radio bearer between the mobile terminal and the radio access network for transmitting the data via a transport channel may be established. Further, a priority for the radio bearer may be assigned to each of a plurality of different scheduling modes usable by the medium access control entity. Further, the data may be transmitted based on the priority assigned to the respective scheduling mode used by the medium control entity. Generally, it should be noted that each established radio bearer may be scheduled in an individual scheduling mode.

In this embodiment, a different priority handling for transmissions depending on the scheduling mode is provided.

According to another embodiment, the medium access control entity may select a transport format combination based on the priority assigned to the respective scheduling mode, wherein the transport format combination comprises a transport format used for transmitting the data via the transport channel. In the step of transmitting, the data may be transmitted using the transport format. This embodiment provides one possibility how TFC selection and prioritizing data transmission dependent on the used scheduling mode may be accomplished.

A further possible implementation according to another embodiment of the invention is applicable in situations in which the data from the radio bearer and other radio bearers is transmitted via one transport channel. In this situation, the data of the radio bearers may be multiplexed to the transport channel based on the priority assigned to the respective scheduling mode used by the medium access control entity for the radio bearer.

In a variation of this embodiment, the medium access control entity may select a transport format combination for the transport channel, wherein the transport format combination comprises a transport format used for transmitting the data via the transport channel, and may transmit the multiplexed data using the transport format.

In another variation of the embodiment, the priorities may be assigned during the establishment of the radio bearer. The radio bearer established may comprise a radio link control entity, and at least one logical channel for providing the data from the radio link control entity to the medium access control entity.

In a further embodiment of the invention, a radio bearer control message may be sent from the radio access network, wherein the radio bearer control message comprises a plurality of information elements indicating the priorities of a logical channel for each of the plurality of scheduling modes. The radio bearer control message may be for example a radio bearer setup message or a radio bearer reconfiguration message. In a variation of this embodiment, the plurality of information elements may be comprised within an information element "RB mapping info".

In a further variation of this embodiment, a radio resource control entity of the mobile terminal may establish the radio bearer in accordance with the set of parameters indicating the priorities of a logical channel of the radio bearer for each of the plurality of scheduling modes received in the radio bearer control message.

According to this embodiment, the mobile terminal may receive the priorities for the available scheduling modes from an entity having radio resource control functionality of the radio access network, e.g. the RNC, and may configure the established radio bearer accordingly.

In a further embodiment of the present invention, the radio link control entity may be configured with a plurality of logical channels, each of the logical channels being used to provide data PDUs carrying the transmission data and each of the logical channels being associated to one of the plurality of scheduling modes. Hence, according to this embodiment, the radio link control entity may be configured with more than one logical channel for user-data transport, wherein individual priorities are assigned to the logical channels.

In a further embodiment, the data may be provided from the radio link control entity to the medium access control entity via a logical channel being associated to the scheduling mode for transmitting the data. In a variation of this embodiment a radio link control entity may be configured with two logical channels, each of two logical channels may be associated to one of two distinct scheduling modes used by the medium access control entity and depending on the scheduling mode presently used data may be provided to same via the first or the second logical channel.

Another embodiment of the present invention provides a more detailed operation of this mechanism. According to this embodiment, a scheduling mode for scheduling the data may be selected. Upon having selected the scheduling mode, the medium access control entity may determine the logical channel associated to the selected scheduling mode, and may request from the radio link control entity the data to be provided via the determined logical channel.

In a variation of this embodiment, the scheduling mode is selected by the mobile terminal or a selection is signalled from the radio access network. According to a further variation of this embodiment, the data are provided from the radio link control entity to the medium access control entity via the requested logical channel.

In another embodiment of the invention, the plurality of scheduling modes comprises a rate controlled scheduling mode and a time and rate controlled scheduling mode.

Further, another embodiment of the invention provides a method for transmitting data from a mobile terminal to a radio access network of a mobile communication system, wherein the mobile terminal comprises a medium access control entity. According to this embodiment, the method may comprise the steps of establishing a radio bearer between the mobile terminal and the radio access network for transmitting the data via a transport channel and assigning a priority to the radio bearer. Further, the data may be transmitted based on the priority assigned to the radio bearer and a flag set in the medium access control entity indicating one of a plurality of scheduling modes used for the radio bearer.

In another embodiment of the present invention, the medium access control entity may select a transport format combination based on the assigned priority and the flag, wherein the transport format combination comprises a transport format used for transmitting the data via the transport channel.

A further embodiment of the invention relates to situations where data from the radio bearer and other radio bearers is transmitted via one transport channel. In this embodiment, the data of the radio bearers may be multiplexed to the transport channel based on the priority assigned to the respective radio bearer and the flag.

In a variation of this embodiment, the medium access control entity may further select a transport format combination for the transport channel, wherein the transport format combination comprises a transport format used for transmitting the data via the transport channel, and may transmit the multiplexed data using the transport format.

In a further embodiment, when the flag is set a higher priority than the assigned priority, and in case the flag is not set the assigned priority is used.

Further, the flag may for example indicate whether a rate controlled scheduling mode or a time and rate controlled scheduling mode is used.

In another embodiment of the invention the rate controlled scheduling mode is assigned a lower priority than the time and rate controlled scheduling mode.

Moreover, in another embodiment of the present invention, the mobile communication system is a UMTS system and the data is transmitted via an E-DCH.

A further embodiment of the present invention provides a mobile terminal for transmitting data transmitted to a radio access network of a mobile communication system via a wireless link. The mobile terminal comprises a processing means for establishing a radio bearer between the mobile terminal and the radio access network for transmitting the data via a transport channel. The processing means is adapted to assign to each of a plurality of different scheduling modes usable by a medium access control entity a priority for the radio bearer. Further, a transmitter of the terminal may transmit the data based on the priority assigned to the respective scheduling mode used by the medium control entity for the radio bearer.

Another embodiment of the present invention provides a mobile terminal for transmitting data to a radio access network of a mobile communication system via a wireless link, wherein the mobile terminal comprises a processing means for establishing a radio bearer between the mobile terminal and the radio access network for transmitting the data via a transport channel, and for assigning a priority to the radio bearer. Further, the mobile terminal comprises the transmitter for transmitting the data based on the priority assigned to the radio bearer and a flag set in the medium access control entity indicating one of a plurality of scheduling modes used by the medium access control entity for the radio bearer.

Both mobile terminals described above may further comprise means adapted to perform the steps of the data transmission method according to one the various embodiments of the invention outlined above.

Moreover, another embodiment of the invention is related to a computer readable medium for storing instructions that, when executed by a processor, cause the processor to transmit data from a mobile terminal to a radio access network of a mobile communication system via a wireless link. The processor is caused to transmit the data by establishing a radio bearer between the mobile terminal and the radio access network for transmitting the data via a transport channel, assigning to each of a plurality of different scheduling modes usable by a medium access control entity a priority for the radio bearer, the medium access control entity being comprised by the mobile terminal, and transmitting the data based on the priority assigned to the respective scheduling mode used by the medium control entity for the radio bearer.

A computer readable medium for storing instructions that, when executed by a processor, cause the processor to transmit data from a mobile terminal to a radio access network of a mobile communication system via a wireless link. The processor is caused to transmit the data by establishing a radio bearer between the mobile terminal and the radio access network for transmitting the data via a transport channel, assigning a priority to the radio bearer, and transmitting the data based on the priority assigned to the radio bearer and flag set in the medium access control entity indicating one of a plurality of scheduling modes used by the medium access control entity for the radio bearer.

The computer readable mediums above may further store instructions that, when executed by the processor, cause the processor to perform the steps of the data transmission method according to one of various embodiments outlined above.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION OF THE INVENTION

Figure 1:
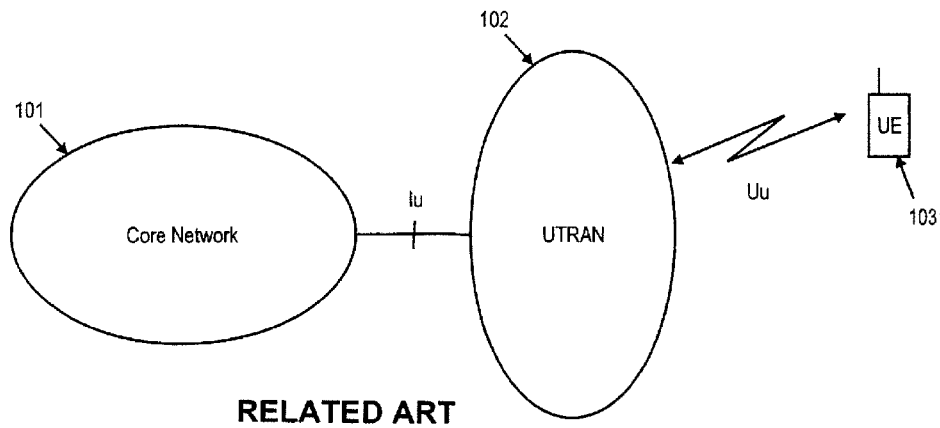
FIG. 1 shows the high-level architecture of UMTS.
Figure 2:
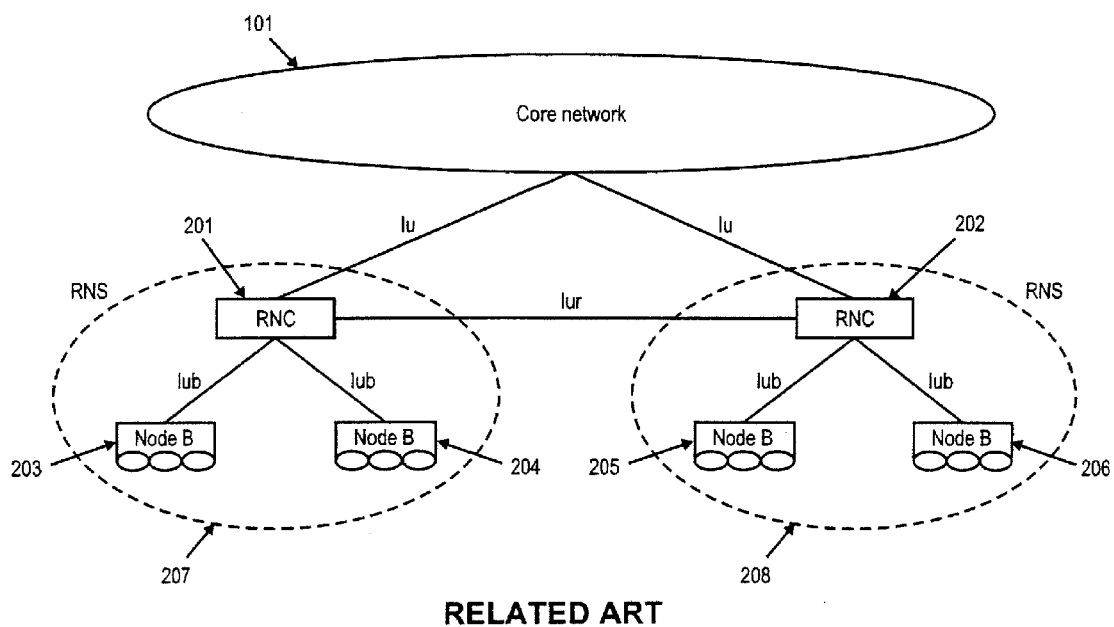
FIG. 2 shows the architecture of the UTRAN according to UMTS R99/4/5.
Figure 3:
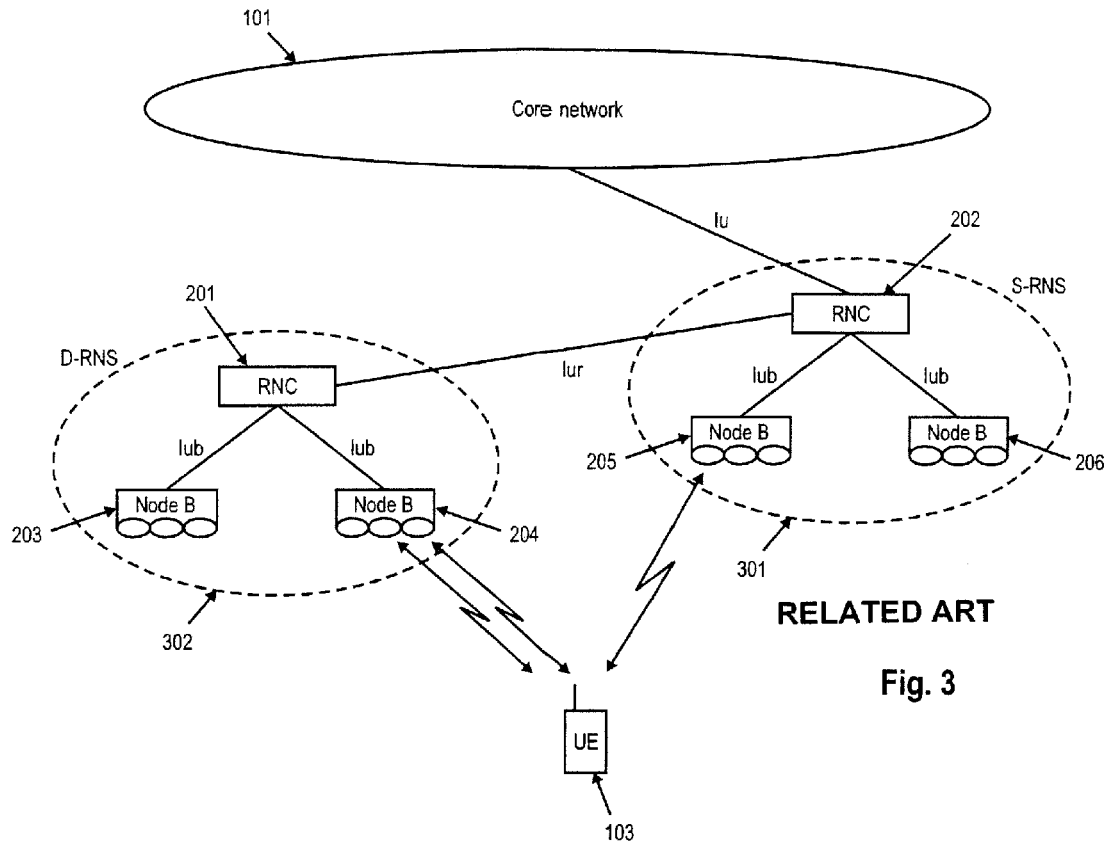
FIG. 3 shows an architectural overview of a Serving and Drift Network Subsystem.
Figure 4:
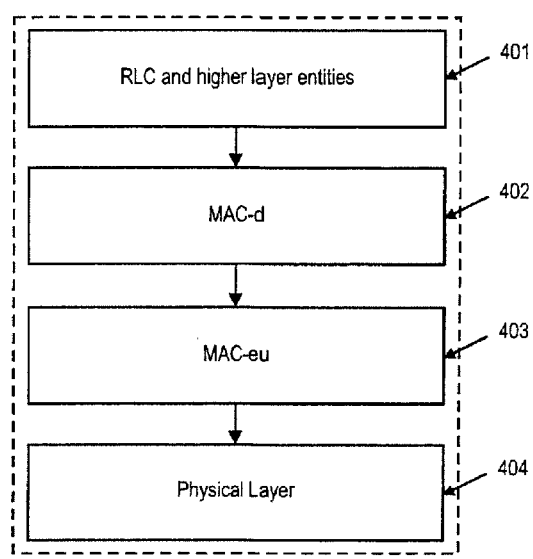
FIG. 4 shows an overall E-DCH MAC architecture on UE side.
Figure 5:
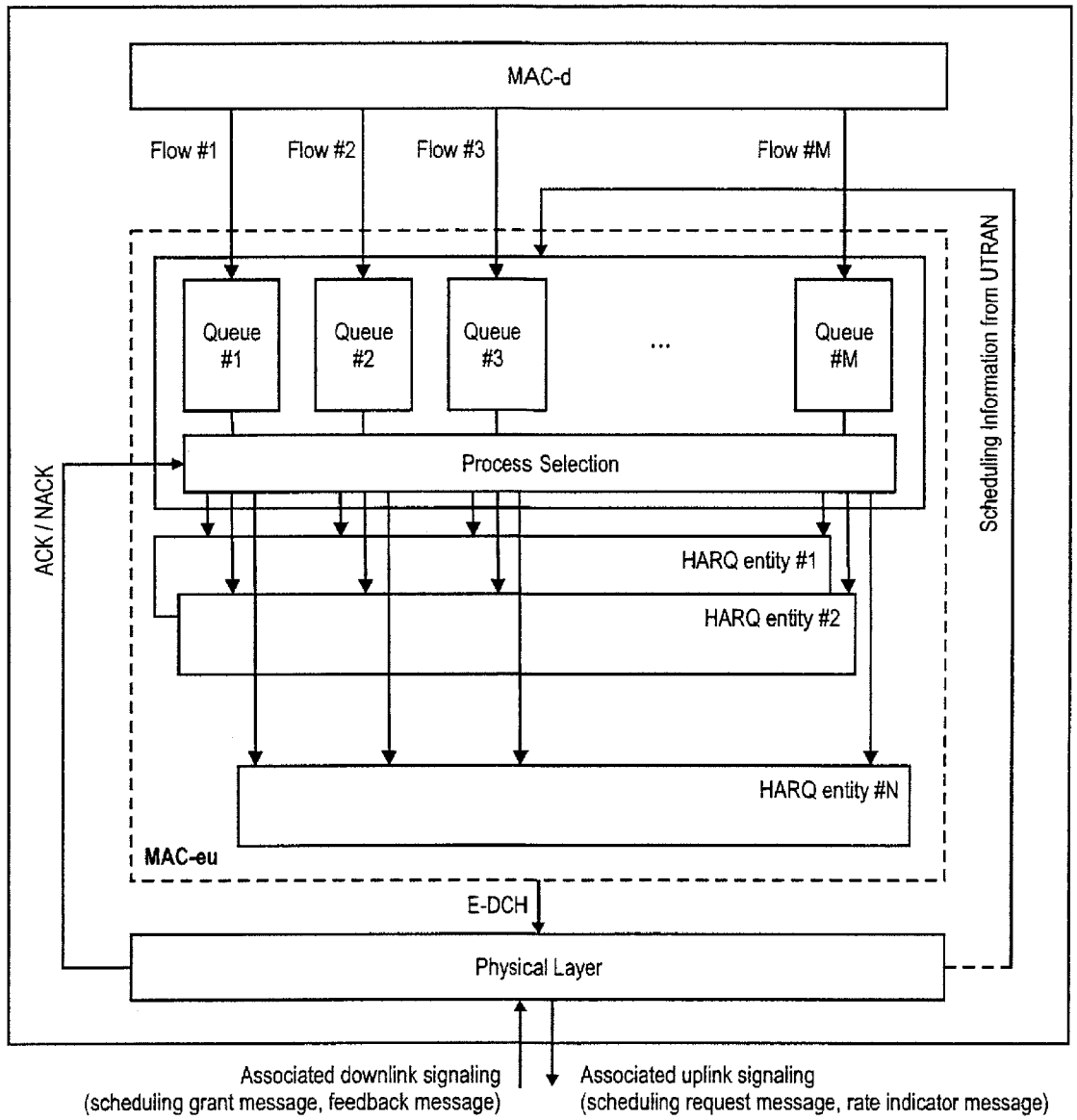
FIG. 5 shows a MAC-eu architecture in a mobile terminal (UE)
Figure 6:
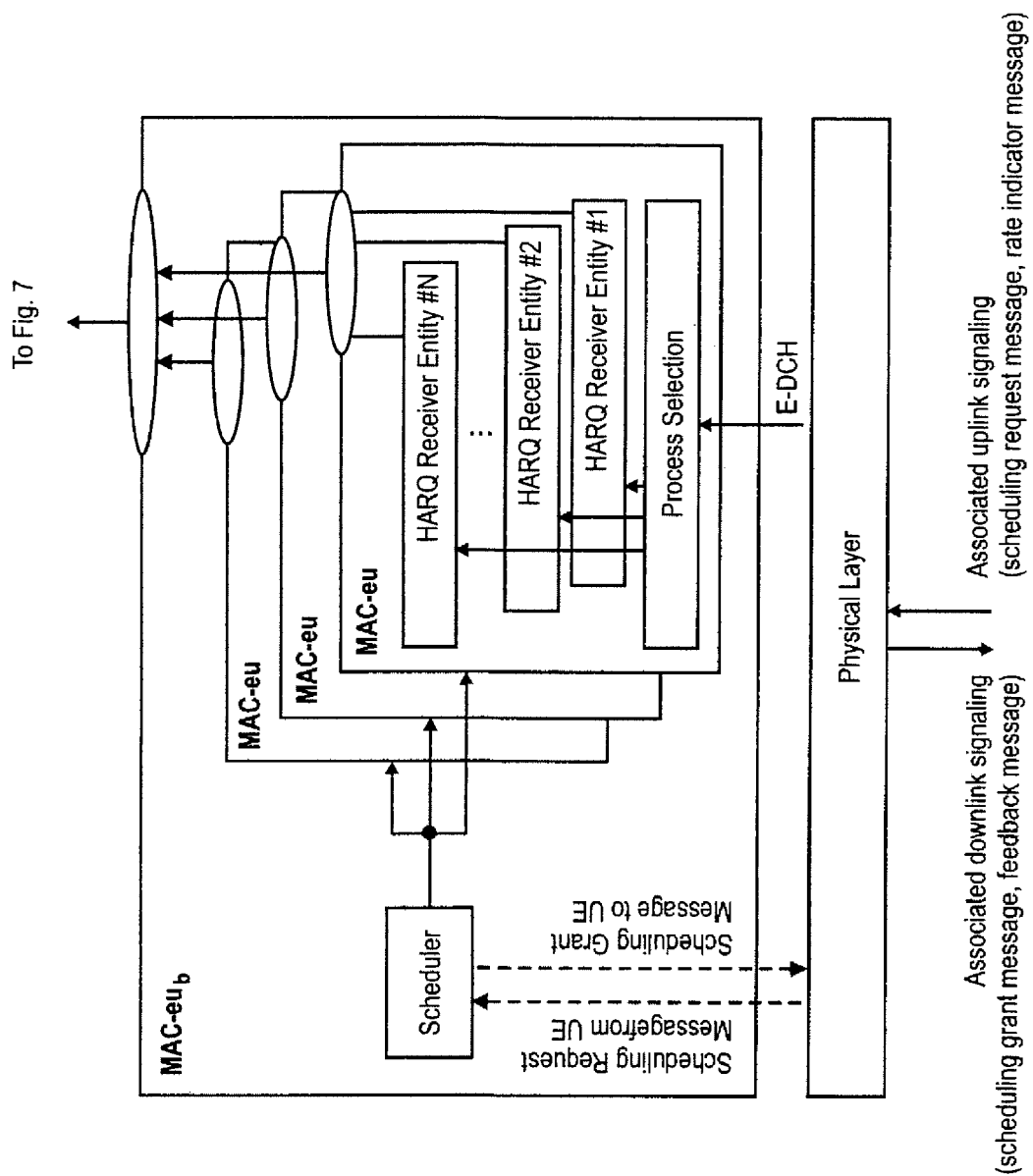
FIG. 6 shows a shows a MAC-eu architecture in a Node B of the UTRAN.
Figure 7:
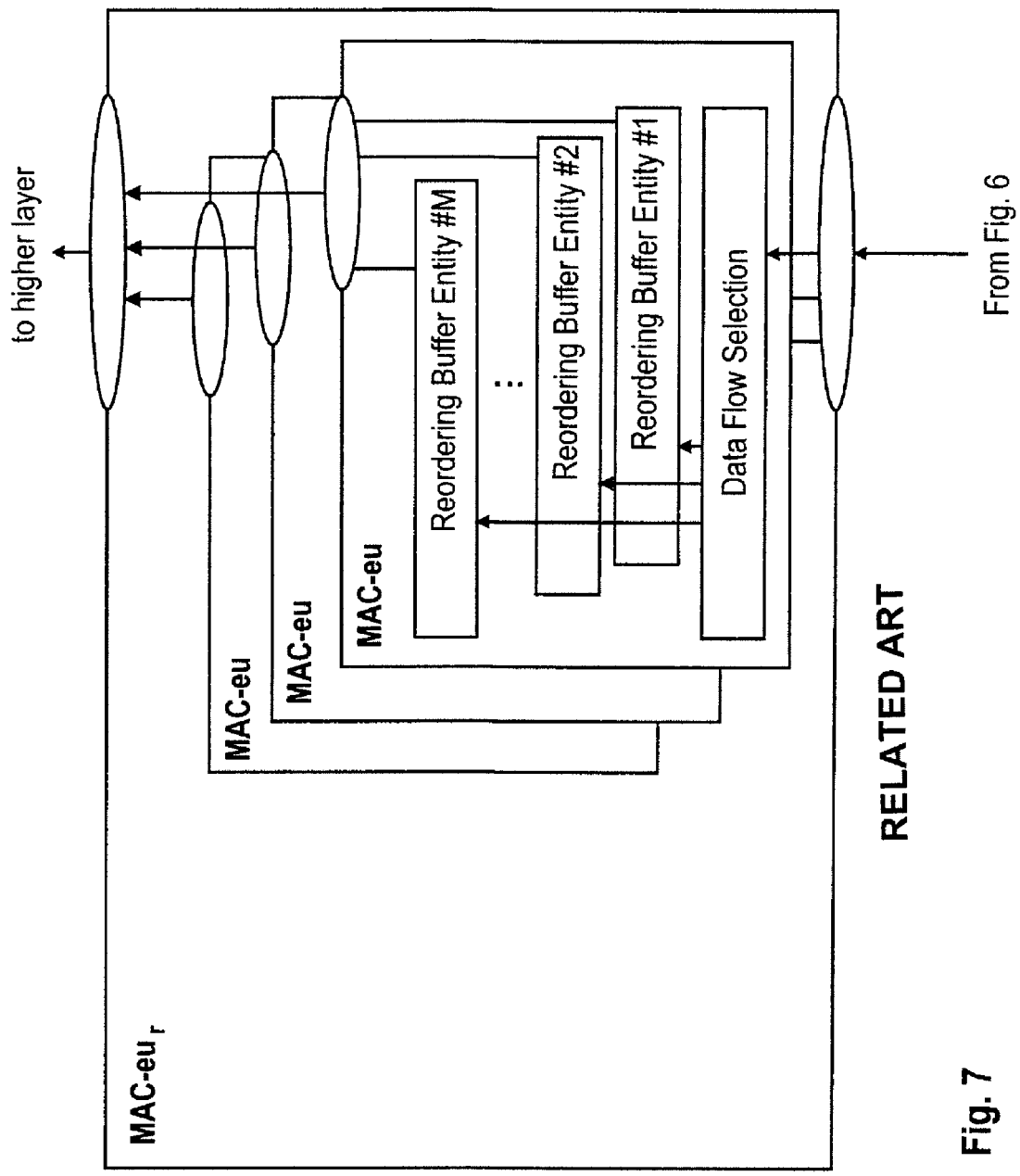
FIG. 7 shows a MAC-eu of a Serving RNC in the UTRAN.
Figure 8:
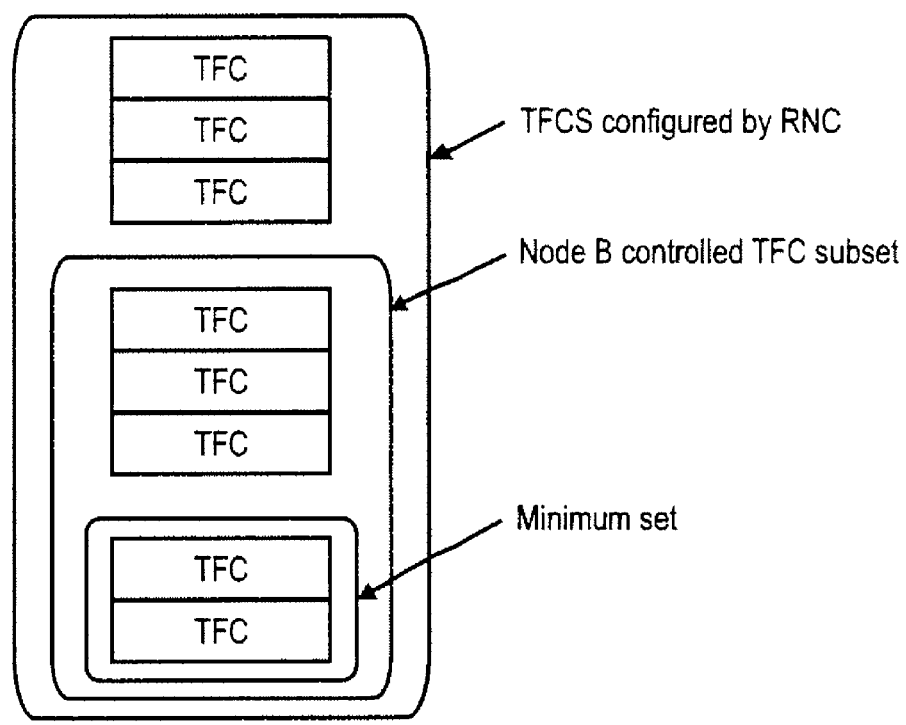
FIG. 8 shows TFC sets for Node B controlled scheduling.
Figure 9:
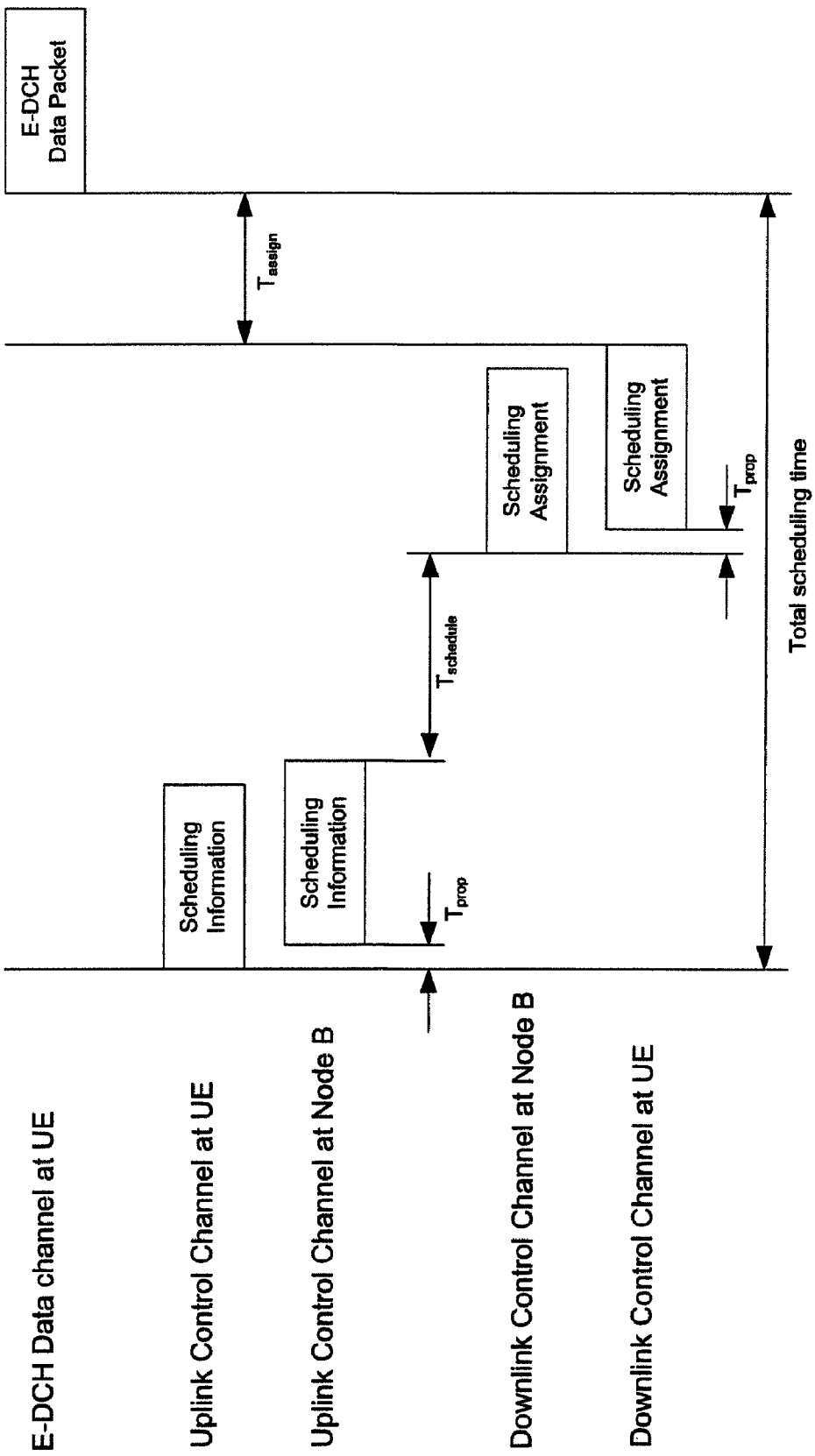
FIG. 9 shows the message flow of a time and rate controlled scheduling mode.
Figure 10:
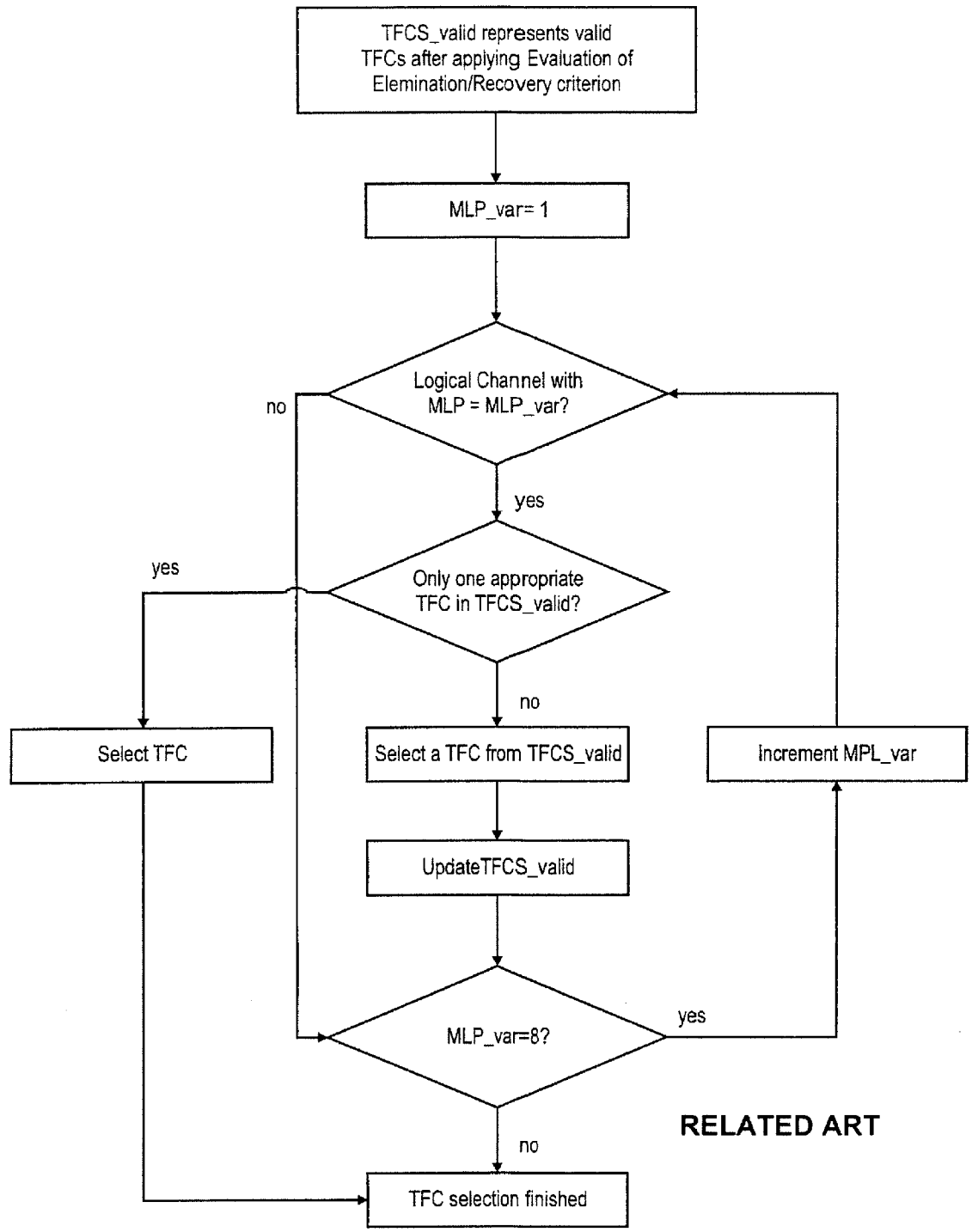
FIG. 10 shows an exemplary TFC selection procedure at the mobile terminal (UE)
Figure 11:
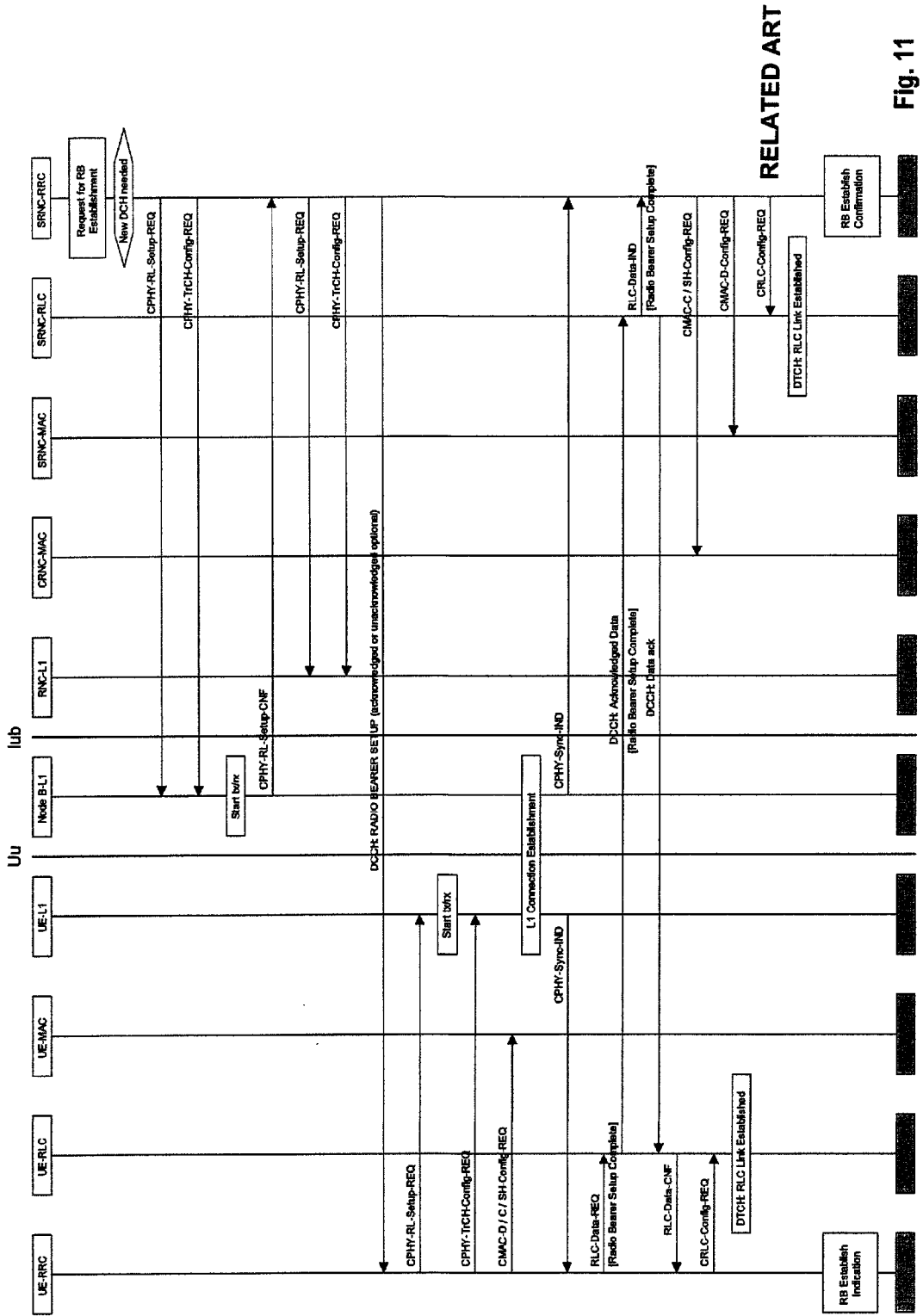
FIG. 11 shows a Radio Bearer Establishment procedure with dedicated physical channel activation.

The following paragraphs will describe various embodiments of the present invention. For exemplary purposes only, most of the embodiments are outlined in relation to a UMTS communication system and the terminology used in the subsequent sections mainly relates to the UMTS terminology. However, the used terminology and the description of the embodiments with respect to an UMTS architecture is not intended to limit the principles and ideas of the present inventions to such systems.

Also the detailed explanations given in the Technical Background section above are merely intended to better understand the mostly UMTS specific exemplary embodiments described in the following and should not be understood as limiting the present invention to the described specific implementations of processes and functions in the mobile communication network.

Generally, the principles of the present invention may be applicable to any kind of mobile communication systems employing a distributed architecture, for example to communication systems based on the IMT-2000 framework which uses priority based scheduling or mechanisms similar to TFC selection. The present invention is also applicable to a dedicated channel other than the E-DCH.

According to one aspect of an embodiment of the invention a different priority handling of uplink transmissions depending on the scheduling mode is introduced. For each scheduling mode an individual priority may be assigned to a radio bearer. Data transmissions may be performed based on the priority, which has been assigned to the scheduling mode presently used.

One possibility may be to use an adapted TFC selection procedure for scheduling which is adapted in that the TFC selection procedure determines the priority used for selecting the TF for a radio bearer based on the scheduling mode presently used. E.g. when data of a radio bearer is "scheduled" using a time and rate controlled scheduling mode, the TFC selection procedure may use another priority (MLP) for the radio bearer for TFC selection than when transmission is carried out in a rate controlled scheduling mode.

According to a variation of this embodiment, transmissions in the time and rate controlled scheduling mode may have a higher priority than transmissions in the rate controlled mode.

Another approach may be used for systems where different logical channels are multiplexed to a single transport channel. The TFC selection procedure selects (amongst others) the TF for this transport channel. In order to introduce a different priority handling based on the scheduling mode, the multiplexing may multiplex the data from the different logical channels based on their priority for the respective scheduling mode presently used.

In the following different embodiments of the present invention will be outlined on improvements applied to the TFC selection procedure, the radio bearer establishment, etc. for data transmissions on the E-DCH. However it should be noticed that the invention is not limited to the use of E-DCH.

As outlined before, for efficient transmission on E-DCH in the uplink there may be a different priority handling for E-DCH depending on the scheduling mode. In the uplink the sharing of the physical channel data rate between the transport channels is done by TFC selection. As described before TFC selection may be done in accordance to the logical channel priorities. The channel priorities may be for example signaled by radio resource control (RRC).

The transmission of higher priority data shall be maximized by the TFC selection process. In a conventional UMTS system, the MAC logical channel priority (MLP) is assigned to each logical channel at radio bearer setup. In order to change the MLP of a logical channel the radio bearer needs to be reconfigured using a radio bearer reconfiguration procedure.

Considering a different priority handling depending on the scheduling mode, one embodiment of the invention foresees different MLPs for the rate controlled scheduling mode and the time and rate controlled scheduling mode. In the conventional UMTS systems, changing of the scheduling mode, i.e. based on the buffer occupancy, would require a radio bearer reconfiguration, which is relatively slow and requires a significant signaling overhead (RRC signaling).

One aspect of the present invention is to avoid additional RRC signaling and the delay caused by a radio bearer reconfiguration procedure. According to an embodiment of invention two MAC logical channel priorities (MLP) are defined for a radio bearer. The radio bearer may be mapped to an E-DCH. It should be noted, that the number of two is only an example, as for the E-DCH two scheduling modes may exist. In general, each scheduling mode available for a specific radio bearer may be assigned a priority respectively.

These two MLPs may be set during the radio bearer setup procedure, e.g. by using a radio bearer setup transmitted from the S-RNC. Alternatively, a separate signaling may be defined to convey the priorities for the different scheduling modes to the UE (mobile terminal) or the priorities may be at least partly chosen by the UE autonomously.

E.g. one MLP corresponds to the rate controlled mode and the other MLP to the Ume and rate controlled mode. The MLP for time and rate controlled scheduling mode may be chosen higher than the MLP for rate controlled mode. In Rel99/4/5 the MAC logical channel priority is defined in the Information Element (IE) "RB mapping info" (see TS 25.331: "Radio Resource Control (RRC); Protocol Specifications (Release 6)", version 6.1.0, sections 10.2.33: ">RAB information for setup", 10.3.4.10, and 10.3.4.20).

In the following table, which is an exemplary extract from the IE "RB mapping info", a second IE ">>second MAC logical channel priority" is added, corresponding to the second MLP value assigned to the radio bearer. This second MLP may indicate the logical channel priority in time and rate controlled mode (scheduled transmissions), while the first MLP may indicate the logical channel priority in rate controlled mode. In another embodiment, the new IE ">>second MAC logical channel priority" is only set if, the radio bearer is mapped to an E-DCH, as noted in the following tables. Please note that the tables only provide an example for defining the provision of priority values for the different scheduling modes.

| | | Group name | | | |
|---|---|---|---|---|---|
| Information Element | Need | Multi | Type and reference | Semantics description | Version |
| >>MAC logical channel priority | MP | | Integer (1 ... 8) | This is priority between a user's different RBs (or logical channels). [15] | |
| >>second MAC logical channel priority | UL-RB mapping | | Integer (1 ... 8) | This is priority between a user's different RBs (or logical channels) for scheduled transmissions on E-DCH | |

| Condition | Explanation |
|---|---|
| UL-RB mapping | If RB is mapped to E-DCH, then this IE is mandatory present. Otherwise this IE is not needed. |

In the example shown in the tables above, two priorities have been assigned to the radio bearer, i.e. one priority for each scheduling mode. In case more than two scheduling modes exist, more new IE indicating "additional" channel priorities may be included. Further, also a mapping of the priorities indicated in the IEs to the respective scheduling mode may be defined. Moreover, it should be noted that priorities for each scheduling mode may also be used for mapping radio bearers onto other dedicated channels than E-DCH- In this case, the "UL-RB mapping" condition shown in the table needs to be adapted accordingly.

When considering data transmission via an E-DCH, TFC Selection is done in the MAC-e entity of the UE. The conventional procedure currently standardized for UMTS has been described above. According to an embodiment of the present invention, this TFC selection procedure is improved in that the MAC-e entity may determine the scheduling mode it is currently operated in and based on this result may base the TFC selection on the MLP assigned to the presently used scheduling mode for each of the radio bearers for which TFs need to be specified for their transport channels.

Thus, depending on the scheduling mode, MAC-e may use either first or second MLP for TFC selection. The UE (MAC-e) may either decide the scheduling mode, I.e. based on amount of data to transmit, or UE may be notified by means of signaling (for example from Node B) about scheduling mode to use. Having two MLPs for a radio bearer mapped on E-DCH avoids the necessity of performing a radio bearer reconfiguration for changing the MLP.

Figure 12:
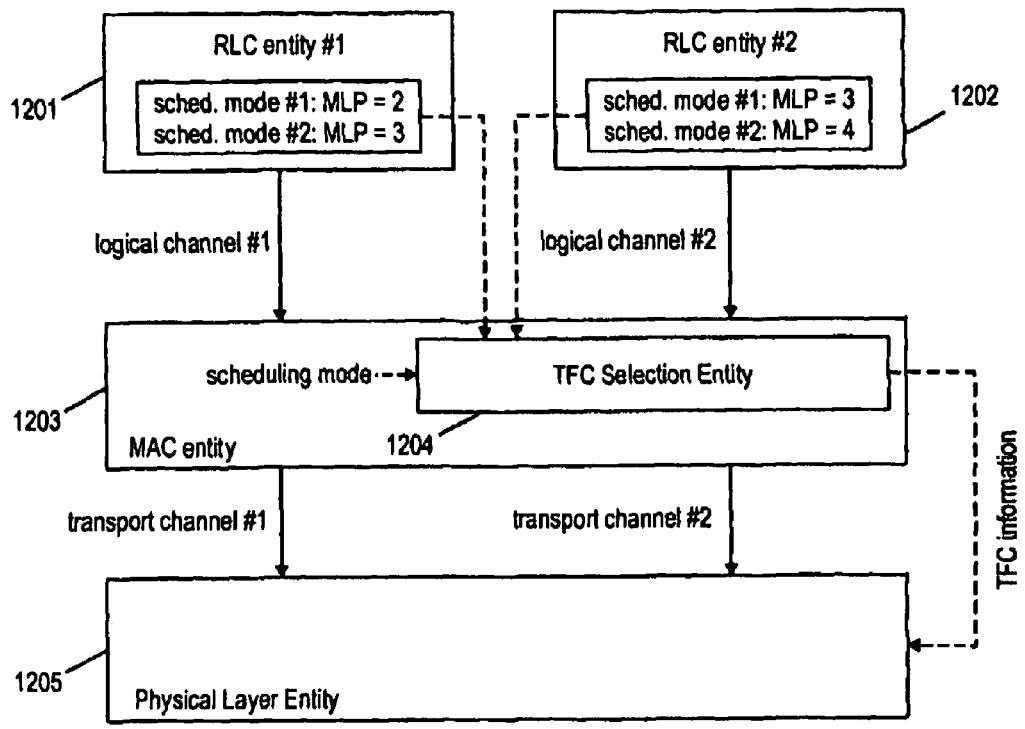
FIG. 12 to 15 show the relation between RLC, MAC and Physical Channel Entity within a mobile terminal for prioritizing data transmission based on the scheduling mode according to different exemplary embodiments of the invention.

FIG. 12 shows an exemplary overview of a configuration according to the embodiment described above. In the example, it is assumed that two radio bearers have been established in the UE, two RLC entities 1201 and 1202 have been configured. According to the example, each of the RLC entities 1201 and 1202 has been configured with one logical channel. Each logical channel has been assigned two MLPs, one for the time and rate controlled scheduling mode and one for the rate controlled scheduling mode.

The MAC entity 1203 comprises a TFC Selection entity 1204. The TFC selection entity is provided with the MLPs of the different logical channels and the MAC entity chooses the appropriate MLP value based on the scheduling mode used for the radio bearer. Alternatively the TFC Selection entity 1204 may obtain the appropriate MLP to be used for TFC selection dependent on the scheduling mode used.

In any case, the TFC Selection entity 1204 determines the TFC according to the respective MLPs of the logical channels. Further, the TFC information is provided to the Physical Layer entity 1205. The MAC entity 1203 further provides the transmission data of the logical channels vial the transport channels to the Physical Layer entity 1205 which transmits the data using the TFs indicated in the TFC information.

Another implementation possibility for using different priority values dependent on the scheduling mode is outlined in the following. According to another embodiment of the present invention, the AM RLC entity may be configured with two (or more) logical channels in the uplink. Since interactive, background and streaming services may be transmitted on E-DCH, it may be assume that RLC operates in acknowledged mode for services using E-DCH According to this embodiment, the RLC may be configured with a logical channel for each scheduling mode available at MAC and a (static) mapping between a logical channel and a scheduling mode may thus be maintained for each radio bearer. Each of the logical channels is assigned an individual MLP. The MLPs of the logical channels may for example be configured by RRC signaling and may be configured independently.

In current specification the second logical channel shall be used only for the transmission of control PDUs. Therefore transmission of data PDUs on both logical channels is not allowed. According to this embodiment, a different priority handling for E-DCH transmission may be implemented by configuring the RLC entity utilizing two logical channels for data transmission.

One logical channel is for example used for transmission in rate controlled mode, the other for transmission in time and rate controlled scheduling mode. The MLPs for the two logical channels may be configured by S-RNC in the radio bearer setup procedure, e.g. using IE in the radio bearer setup message. As outlined above, it may also be possible to foresee signaling of MLPs in a newly defined message. Another alternative may be to signal one MLP and to let the UE autonomously chose the remaining MLP values, for example based on the signaled MLP.

The logical channel used for transmission in time and rate controlled scheduling mode may have a higher degree of priority. Hence the MLP should be lower than the MLP of the other logical channel.

For data transmission MAC requests RLC to send data either on the first or second logical channel depending on the scheduling mode. This may be established by a primitive communicated between MAC and RLC. For example MAC-Status-Ind primitive commonly used for indicating to RLC for each logical channel the rate at which it may transfer data to MAC may be used. The MAC may select the respective logical channel via which data may be provided from the RLC by setting the transfer rate for the other logical channel(s) to zero, while the transfer rate of the selected logical channel is set to the desired value.

In this process, the MAC will determine the scheduling mode for the radio bearer it is instructed to use (by signaling) or which it has chosen for data transmission, and may indicate to the RLC the logical channel corresponding to the scheduling mode used. As the logical channels may be assigned different MLPs, the MAC will automatically consider the appropriate MLP for TFC selection.

In an alternative embodiment of the invention, logical channels of the radio bearer and other radio bearers are multiplexed to a single transport channel. Also in this embodiment, a similar configuration of the RLC entity may be foreseen. Instead of selecting the logical channel through which data should be provided from the RLC entity for scheduling, i.e. TFC selection as described above, the MAC entity may multiplex data of the logical channels to a the single transport channel based on the priorities which have been assigned to the individual logical channels. By controlling the data provision by means of the logical channels of a single radio bearer, the MAC entity may use different priorities for multiplexing the different logical channels based on the scheduling mode.

Figure 13:
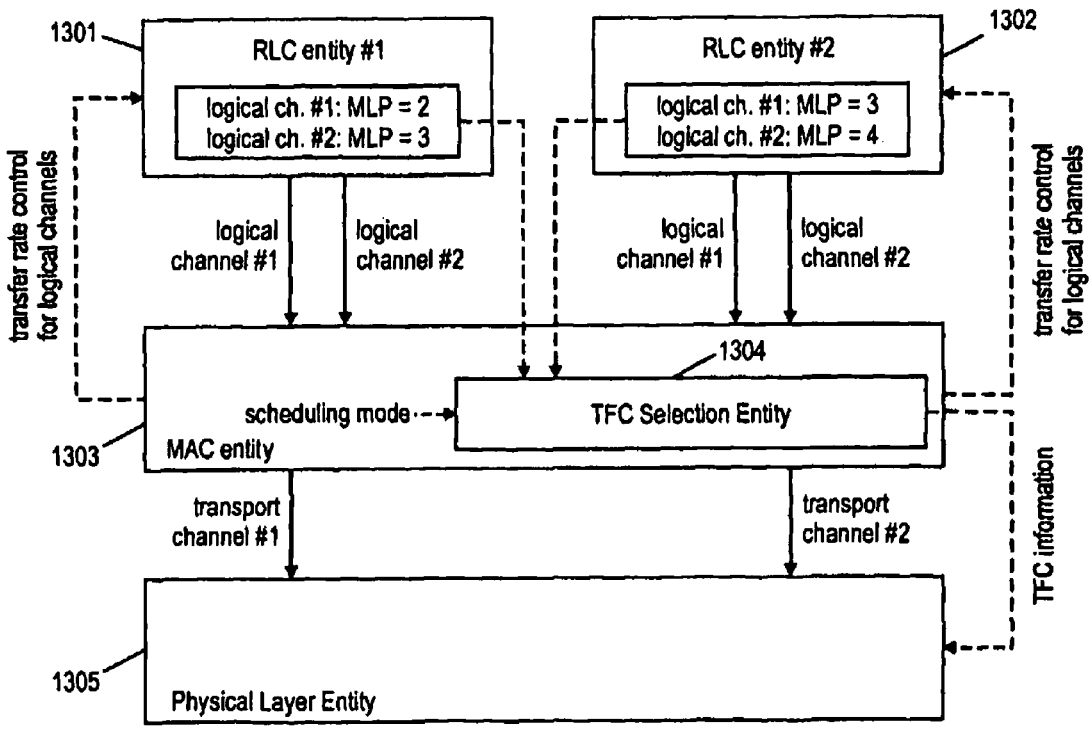

FIG. 13 shows the approach taken by the embodiment related to TFC selection and the use of different logical channels for data transmission per radio bearer. Assuming that two radio bearers have been established in the UE, two RLC entities 1301 and 1302 have been configured. In the example, each of the RLC entities 1301 and 1302 has been configured with two logical channels for transporting data PDUs and with one MLP for each logical channels of the respective RLC entity. The MAC entity 1303 comprises a TFC Selection entity 1304 for selecting the appropriate TFC for data transmission.

As described above, the MAC entity 1303 may control the transfer rate with which data (data PDUs) is provided from the RLC entities #1 and #2. Each of the two logical channels of a radio bearer has been associated with an individual MLP. The MAC entity 1303 determines the scheduling mode presently used for scheduling the data from respective RLC entity #1 or #2. Depended thereon, it may set the transfer rate such that for example RLC entity #1 provides data via logical channel #1 for transmission in the time and rate controlled scheduling mode and via logical channel #2 when transmission is carried out in the rate scheduling mode. Dependent on the activated logical channel, the MAC entity 1303 considers the respective assigned MLP value for TFC selection by the TFC selection entity 1304.

The TFC Selection entity 1304 determines the TFC comprising the TF for the transport channels on which the logical channels are mapped. The TFC information and the data to be transmitted are forwarded by the MAC entity 1303 to the Physical Layer entity 1305 for transmission.

Another embodiment of the invention allowing different priority handling for E-DCH transmission depending on the scheduling mode, foresees the usage of a flag in MAC-e on UE side. The flag may be set by MAC-e depending on the scheduling mode. As outlined previously, the scheduling mode may be set by explicit signaling or may be selected by the UE. When transmission on E-DCH is carried out in time and rate controlled mode the flag is set to 1. For transmission in rate controlled mode the flag is set to 0. The RLC of each radio bearer may be configured with one (or more) logical channel(s) for data transmission being configured with individual MLPs. For each logical channel, which is mapped on an E-DCH, such a flag exists in the MAC-e on UE side.

When performing TFC selection, the TFC Selection entity in the UE may determine for each logical channel whether the flag is set or not. Alternatively, the MAC entity may also multiplex the data of different radio bearers to a single transport channel based on the flag and priorities assigned to the different radio bearers.

A flag set to 1 may for example indicate to the TFC Selection entity, that the corresponding logical channel should be prioritized against other simultaneous traffic (on other logical channels) in the uplink. A variation of this embodiment foresees that traffic on DCCH, which is usually RRC signaling, and conversational services should have higher priority than E-DCH transmission in time and rate controlled scheduling mode.

In case the flag for a logical channel is not set, indicating rate controlled mode, the TFC selection may be done in accordance to the priorities configured for the logical channel(s).

When using a flag indicating the presently used scheduling mode, the logical channels of the radio bearer may be configured with MLPs for each possible scheduling mode, and based on the flag, the MAC may use the appropriate MLP value for TFC selection. Another possibility may be, that the logical channels of the radio bearer are configured with only one MLP value for each logical channel and the MAC determines the appropriate MLP to use for TFC selection based on the configured MLP and the scheduling mode indicated by the flag.

For example, a logical channel of a radio bearer may be configured with an MLP=4 corresponding to the MLP value used for TFC selection in the rate scheduling mode. In case the flag indicates the use of a time and rate scheduling mode for scheduling data of the radio bearer, the MAC entity may set the MLP value used for TFC selection to the configured MLP of 4 minus one.

Figure 14:
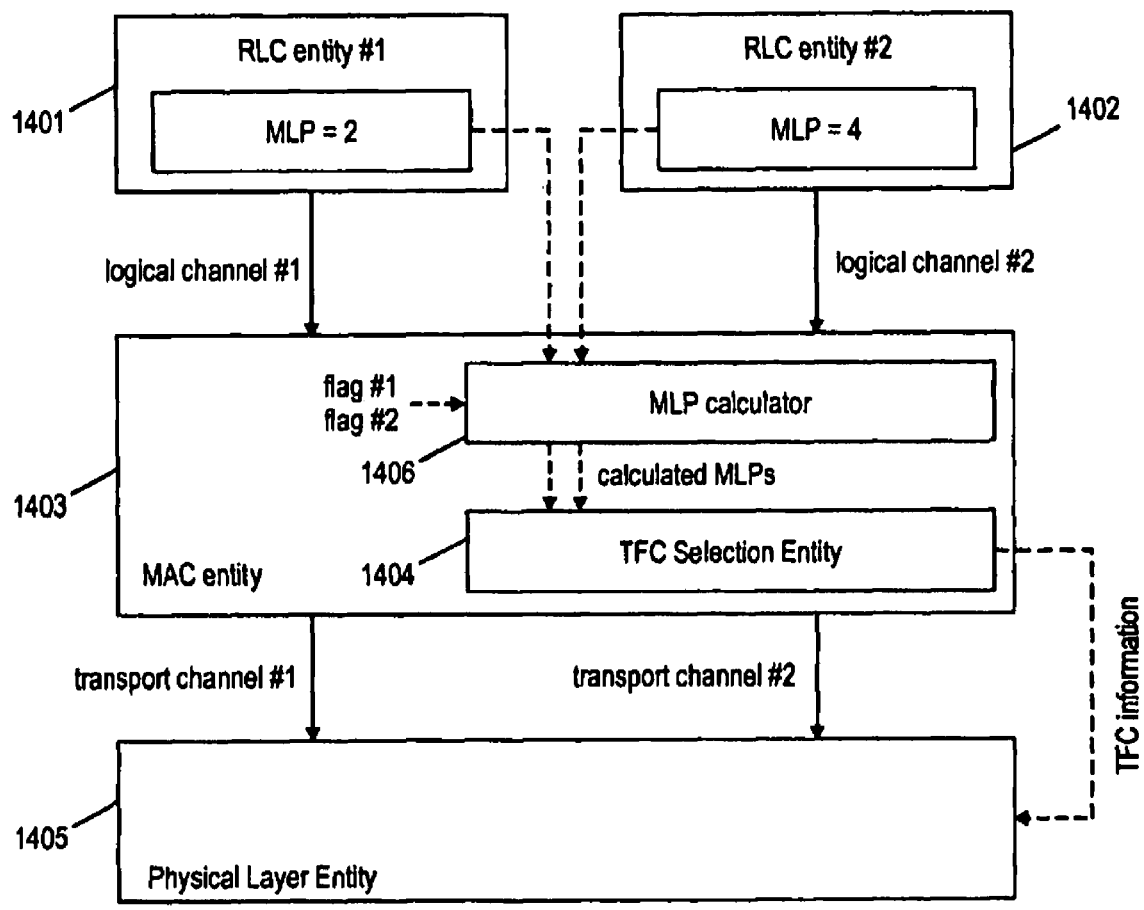

Such an example is shown in FIG. 14. Assuming that two radio bearers have been established in the UE, two RLC entities 1401 and 1402 have been configured. In the example, each of the RLC entities 1401 and 1402 has been configured with one logical channel and with one MLP value for the logical channel of the respective RLC entity. The MAC entity 1403 comprises a MLP calculator 1406 and a TFC Selection entity 1404.

As described above, the MLP calculator 1406 evaluates the flags #1 and #2 indicating the scheduling mode for the data received via logical channel #1 and #2 respectively in order to determine the respective scheduling mode used for the data of the logical channels. In case it is determined that a flag indicates the use of a time and rate scheduling mode, the configured MLP of the respective logical channel is changed to a higher priority. Otherwise the configured MLP value is used for the logical channel.

The determined MLPs for the individual logical channels are then passed to the TFC Selection entity 1404, which determines the TFC comprising the TF for the transport channels on which the logical channels are mapped. The TFC information and the data to be transmitted are forwarded by the MAC entity 1403 to the Physical Layer entity 1405 for transmission.

In the embodiments of the invention described above, each radio bearer is mapped to its own transport channel. In a further embodiment, of the present invention, several logical channels are mapped to one transport channel. As already mentioned before the MAC entity may select an appropriate transport format for each transport channel during TFC selection and may further select the data quantity of each logical channel to be transmitted on the associated transport channel during the corresponding transmission time interval.

According to this embodiment of the present invention multiple logical channels or data flows may be multiplexed together on a single transport channel, for example an E-DCH. The multiplexing is done in the MAC entity. The rate of each logical channel or data flow is controlled in a similar way as in the TFC Selection procedure as described in the embodiments above. The multiplexing is done in accordance to the logical channel priorities of each logical channel (respectively data flow). Depending on the currently used scheduling mode MAC will consider the appropriate MLP for multiplexing the data of different channels to the transport channel.

Figure 15:
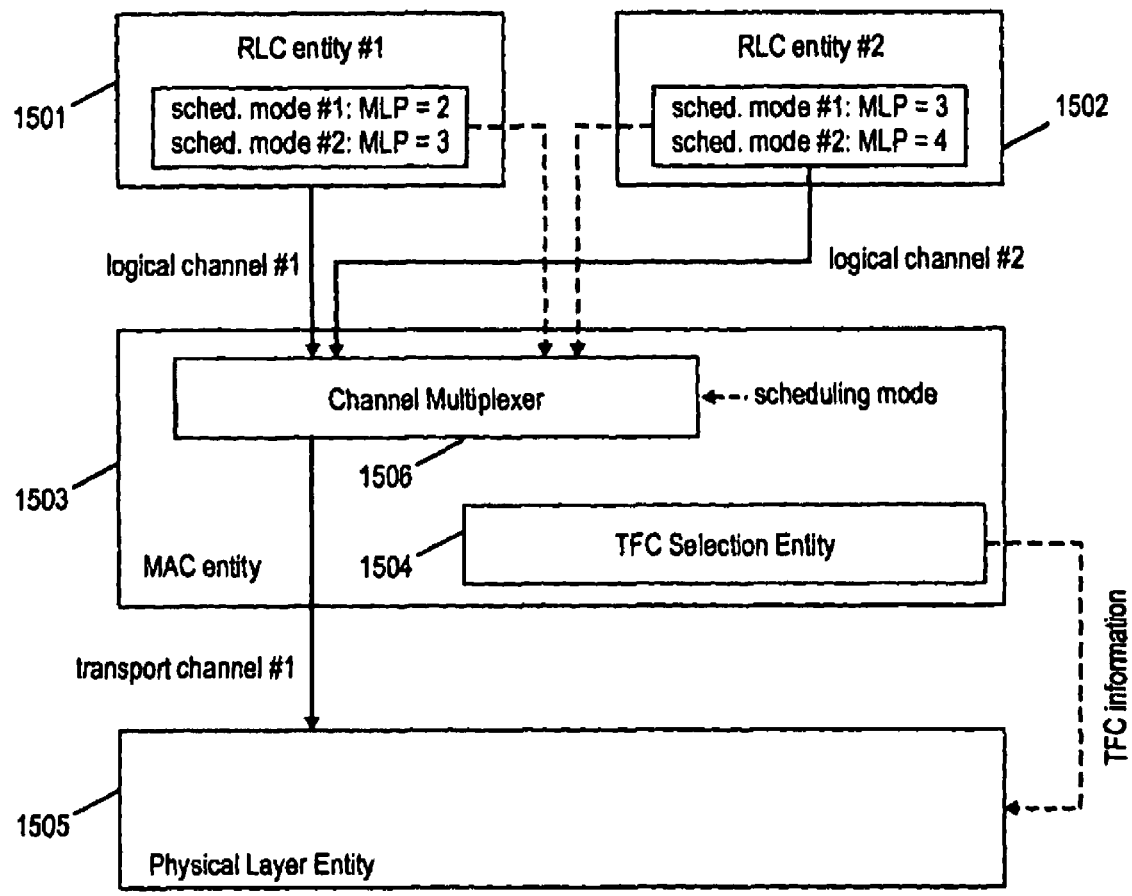

FIG. 15 shows the relation between RLC, MAC and Physical Channel Entity within a mobile terminal for prioritizing data transmission based on the scheduling mode according to one exemplary embodiment of the invention. Each radio bearer is configured with a RLC entity #1 (1501) and #2 (1501) and a logical channel #1 and #2, respectively. Each RLC entity has been assigned two priorities for each scheduling mode available.

The transmission data is provided via the logical channels to the MAC entity 1503, more specifically to the channel multiplexer 1506. Depending on the scheduling mode, the channel multiplexer 1506 selects the appropriate MLP for each bearer based on which it decides the quantity of data to be multiplexed from each logical channel to the transport channel #1.

Further, the TFC Selection entity 1504 selects the appropriate TFC for transmitting the multiplexed data on the transport channel and data of other radio bearers provided via individual transport channels, if same exist. The TFC information is provided from the MAC entity 1503 to the Physical Layer entity 1505, which transmits the data.

Future UTRAN architectures envision the provision of more intelligence (enhanced control & management functions) to be pushed further to the edges of the network, for example to the Node Bs (base stations). One reason to do this may be to eliminate the single point of failure that the RNC constitutes currently. It is further noted that the ideas underlying the present invention may also be employed in evolved UTRAN architectures. The main changes implied by a different underlying UTRAN architecture may be that most communication between UE and RNC will be between UE and Node B in future architectures, e.g. when moving RRC functionality from RNC to Node B.

Another embodiment of the present invention relates to the implementation of the above described various embodiments using hardware and software. It is recognized that the various above mentioned methods as well as the various logical blocks, modules, circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A data transmission method for use in a mobile communication system, the method comprising:
   establishing radio bearers between a mobile terminal and a radio access network of the mobile communication system,
   receiving, at the mobile terminal, radio bearer mapping information from the radio access network, wherein the radio bearer mapping information comprises for each of the radio bearers: (1) a priority indicator for indicating a priority to be assigned to a logical channel to which the respective radio bearer is to be mapped and (2) a scheduling mode out of plural scheduling modes of the logical channel to which the respective radio bearer is to be mapped,
   mapping the radio bearers to logical channels at the mobile terminal taking into account the received radio bearer mapping information, wherein mapping the radio bearers to logical channels comprises assigning to a logical channel on which a respective radio bearer is mapped the priority and the scheduling mode indicated in the radio bearer mapping information,
   multiplexing data of the logical channels to a single transport channel, and
   transmitting by the mobile terminal the multiplexed data of the logical channels on the transport channel.

2. The data transmission method according to claim 1, further comprising selecting by the mobile terminal a transport format combination to be used for transmitting multiplexed data based on at least the priority assigned to the logical channel.

3. The data transmission method according to claim 2, wherein the multiplexed data is transmitted using the selected transport format combination.

4. The data transmission method according to claim 1, further comprising multiplexing data of the logical channels to the transport channel based on the scheduling mode of a respective logical channel and the priority assigned to a respective logical channel.

5. The data transmission method according to claim 1, further comprising receiving, at the mobile terminal, the radio bearer mapping information as part of Radio Resource Control (RRC) signaling information from the radio access network.

6. The data transmission method according to claim 1, wherein the data is transmitted on an enhanced dedicated uplink channel.

7. The data transmission method according to claim 1, wherein the scheduling mode is either a time and rate controlled scheduling mode or a rate controlled scheduling mode.

8. A mobile terminal for use in a mobile communication system, the mobile terminal comprising:
   a processing unit that establishes radio bearers between the mobile terminal and a radio access network,
   a receiving unit that receives, from the radio access network of the mobile communication system, radio bearer mapping information comprises for each of the radio bearers: (1) a priority indicator indicating a priority assigned to a logical channel that is mapped on a transport channel and (2) a scheduling mode out of plural scheduling modes of the logical channel,
   a mapping unit that maps the radio bearer to the logical channels taking into account the received radio bearer mapping information, wherein said mapping unit is operable to assign to a logical channel on which a respective radio bearer is mapped the priority and the scheduling mode indicated in the radio bearer mapping information,
   a multiplexer that multiplexes data of the logical channels to a single transport channel, and
   a transmitting unit that transmits the multiplexed data of the logical channels on the transport channel.

9. The mobile terminal according to claim 8, further comprising a selecting unit that selects a transport format combination to be used for transmitting multiplexed data based on at least the priority assigned to the logical channels.

10. The mobile terminal according to claim 9, wherein the transmitting unit transmits the multiplexed data using the selected transport format combination.

11. The mobile terminal according to claim 8, wherein the multiplexer is operable to multiplex data of the logical channels to the transport channel based on the scheduling mode of a respective logical channel and the priority assigned to a respective logical channel.

12. The mobile terminal according to claim 8, wherein the receiving unit receives the radio mapping information as part of Radio Resource Control (RRC) signaling information from the radio access network.

13. The mobile terminal according to claim 8, wherein the transmitting unit transmits the multiplexed data on an enhanced dedicated uplink channel.

14. The mobile terminal according to claim 8, wherein the scheduling mode is either a time and rate controlled scheduling mode or a rate controlled scheduling mode.

15. A non-transitory computer readable medium storing instructions that, when executed by a processor of a mobile terminal, cause the mobile terminal to perform data transmissions, by:
   establishing radio bearers between a mobile terminal and a radio access network of a mobile communication system, receiving, at the mobile terminal, radio bearer mapping information from the radio access network, wherein the radio bearer mapping information comprises for each of the radio bearers: (1) a priority indicator indicating a priority to be assigned to a logical channel to which the respective radio bearer is to be mapped and (2) a scheduling mode out of plural scheduling modes of the logical channel to which the respective radio bearer is to be mapped, mapping the radio bearers to logical channels at the mobile terminal taking into account the received radio bearer mapping information, wherein mapping the radio bearers to logical channels comprises assigning to a logical channel on which a respective radio bearer is mapped the priority and the scheduling mode indicated in the radio bearer mapping information, multiplexing data of the logical channels to a single transport channel, and transmitting by the mobile terminal the multiplexed data of the logical channels on the transport channel.

16. A data transmission method for use in a mobile communication system, the method comprising:

establishing radio bearers between a mobile terminal and a radio access network of the mobile communication system;

receiving at the mobile terminal radio bearer mapping information from the radio access network, wherein the radio bearer mapping information comprising for each of the radio bearers (1) a priority indicator indicating a priority to be assigned to a logical channel to which the respective radio bearer is to be mapped and (2) a scheduling mode out of plural scheduling modes of the logical channel to which the respective radio bearer is to be mapped;

mapping the radio bearers to logical channels at the mobile terminal taking into account the received radio bearer mapping information, wherein mapping the radio bearers to logical channels comprises assigning to a logical channel on which a respective radio bearer is mapped the priority and the scheduling mode indicated in the radio bearer mapping information;

multiplexing data of the logical channels to a single transport channel based on the scheduling mode of a respective logical channel and the priority assigned to a respective logical channel;

selecting by the mobile terminal a transport format combination to be used for transmitting the multiplexed data based on at least the priority assigned to the logical channels; and transmitting by the mobile terminal the multiplexed data of the logical channels on the transport channel.

17. A mobile terminal for use in a mobile communication system, the mobile terminal comprising:

a processing unit that establishes radio bearers between a mobile terminal and a radio access network of the mobile communication system;

a receiving unit that receives at the mobile terminal radio bearer mapping information from the radio access network, wherein the radio bearer mapping information comprising for each of the radio bearers (1) a priority indicator indicating a priority to be assigned to a logical channel to which the respective radio bearer is to be mapped and (2) a scheduling mode out of plural scheduling modes of the logical channel to which the respective radio bearer is to be mapped;

a mapping unit that maps the radio bearers to logical channels at the mobile terminal taking into account the received radio bearer mapping information, wherein mapping the radio bearers to logical channels comprises assigning to a logical channel on which a respective radio bearer is mapped the priority and the scheduling mode indicated in the radio bearer mapping information;

a multiplexer that multiplexes data of the logical channels to a single transport channel based on the scheduling mode of a respective logical channel and the priority assigned to a respective logical channel;

a selection unit that selects a transport format combination to be used for transmitting the multiplexed data based on at least the priority assigned to the logical channels, and a transmission unit that transmits the multiplexed data of the logical channels on the transport channel.

* * * * *